(12) United States Patent
Nikaku et al.

(10) Patent No.: US 11,360,422 B2
(45) Date of Patent: Jun. 14, 2022

(54) POSITION DETECTOR, IMAGE FORMING APPARATUS, POSITION DETECTING METHOD, AND NON-TRANSITORY RECORDING MEDIUM STORING POSITION DETECTING PROGRAM CODE

(71) Applicant: Ricoh Company, Ltd., Tokyo (JP)

(72) Inventors: Daisuke Nikaku, Kanagawa (JP); Masamoto Nakazawa, Kanagawa (JP); Ryohma Ikemoto, Kanagawa (JP); Osamu Inage, Kanagawa (JP); Tatsuya Ishii, Kanagawa (JP); Satoshi Iwanami, Kanagawa (JP); Hideyo Makino, Tokyo (JP); Kimiharu Yamazaki, Kanagawa (JP); Kohta Aoyagi, Kanagawa (JP); Satoshi Nakayama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 930 days.

(21) Appl. No.: 16/135,578

(22) Filed: Sep. 19, 2018

(65) Prior Publication Data
US 2019/0163112 A1 May 30, 2019

(30) Foreign Application Priority Data
Nov. 30, 2017 (JP) .............................. JP2017-230846

(51) Int. Cl.
*H04N 1/409* (2006.01)
*G03G 15/00* (2006.01)
(Continued)

(52) U.S. Cl.
CPC ..... *G03G 15/6567* (2013.01); *G03G 15/5062* (2013.01); *G06T 7/13* (2017.01);
(Continued)

(58) Field of Classification Search
CPC .......... G03G 15/6567; G03G 15/5062; G06K 9/4604; G06K 9/3216; G06T 7/13;
(Continued)

(56) References Cited

U.S. PATENT DOCUMENTS 5,369,426 A * 11/1994 Jamzadeh .............. G03G 15/01
347/115
5,896,472 A * 4/1999 Takayama .............. H04N 1/506
382/287
(Continued)

FOREIGN PATENT DOCUMENTS

CN            1880098 A      12/2006
JP         H05-188697 A       7/1993
(Continued)

OTHER PUBLICATIONS

Combined Chinese Office Action and Search Report dated Jan. 8, 2020 in Patent Application No. 201811061396.5 (with English Translation of Categories of Cited Documents), 9 pages.
(Continued)

*Primary Examiner* — Charlotte M Baker
(74) *Attorney, Agent, or Firm* — Xsensus LLP

(57) ABSTRACT

A position detector includes a reading device, a position reference member having a mark opposite the reading device, and circuitry. The circuitry controls the reading device to detect the contour of the processing target and the position of the image pattern on the processing target and the position of the mark and corrects a processing position for the processing target to offset distortion of the reading device.

16 Claims, 29 Drawing Sheets

(51) Int. Cl.
*G06T 7/13* (2017.01)
*G06T 7/33* (2017.01)
*G06V 10/44* (2022.01)
*H04N 1/00* (2006.01)

(52) U.S. Cl.
CPC .............. *G06T 7/337* (2017.01); *G06V 10/44* (2022.01); *H04N 1/00824* (2013.01)

(58) Field of Classification Search
CPC ........... G06T 7/337; G06T 2207/10008; G06T 2207/30176; G06T 7/73; H04N 1/00824; G06V 10/44; G06V 10/245
USPC ......................................................... 358/3.26
See application file for complete search history.

(56) References Cited

U.S. PATENT DOCUMENTS

| | | | |
|---|---|---|---|
| 6,198,349 B1 | 3/2001 | Kanno et al. | |
| 6,313,935 B1 | 11/2001 | Makino | |
| 6,320,647 B1 | 11/2001 | Makino | |
| 2001/0020974 A1 | 9/2001 | Makino | |
| 2001/0028388 A1 | 10/2001 | Makino | |
| 2002/0036805 A1 | 3/2002 | Kanno et al. | |
| 2002/0092909 A1 | 7/2002 | Inage | |
| 2002/0097293 A1 | 7/2002 | Castelli et al. | |
| 2002/0135812 A1 | 9/2002 | Inage | |
| 2004/0129872 A1 | 7/2004 | Makino | |
| 2004/0145644 A1 | 7/2004 | Makino | |
| 2004/0170314 A1 | 9/2004 | Harris et al. | |
| 2006/0158508 A1 | 7/2006 | Makino | |
| 2007/0013954 A1 | 1/2007 | Soeda et al. | |
| 2007/0188638 A1 | 8/2007 | Nakazawa et al. | |
| 2007/0216962 A1 | 9/2007 | Inage | |
| 2008/0252787 A1 | 10/2008 | Nakazawa et al. | |
| 2009/0128864 A1 | 5/2009 | Inage | |
| 2010/0027061 A1 | 2/2010 | Nakazawa | |
| 2010/0171998 A1 | 7/2010 | Nakazawa | |
| 2011/0026083 A1 | 2/2011 | Nakazawa | |
| 2011/0026085 A1 | 2/2011 | Tsukahara et al. | |
| 2011/0051201 A1 | 3/2011 | Hashimoto et al. | |
| 2011/0063488 A1 | 3/2011 | Nakazawa | |
| 2012/0060633 A1 | 3/2012 | Ishida et al. | |
| 2012/0099147 A1* | 4/2012 | Tanaka .................. G06F 3/1206 358/1.15 |
| 2012/0141168 A1 | 6/2012 | Makino et al. | |
| 2012/0224205 A1 | 9/2012 | Nakazawa | |
| 2013/0044338 A1 | 2/2013 | Nikaku | |
| 2013/0063792 A1 | 3/2013 | Nakazawa | |
| 2013/0229671 A1 | 9/2013 | Yokozawa et al. | |
| 2013/0250377 A1 | 9/2013 | Kitai et al. | |
| 2013/0250378 A1 | 9/2013 | Kitai et al. | |
| 2013/0258368 A1 | 10/2013 | Shigemoto et al. | |
| 2013/0258369 A1 | 10/2013 | Suzuki et al. | |
| 2014/0029065 A1 | 1/2014 | Nakazawa | |
| 2014/0078532 A1 | 3/2014 | Nikaku | |
| 2014/0185112 A1 | 7/2014 | Nakayama | |
| 2014/0204427 A1 | 7/2014 | Nakazawa | |
| 2014/0204432 A1 | 7/2014 | Hashimoto et al. | |
| 2014/0211273 A1 | 7/2014 | Konno et al. | |
| 2014/0368893 A1 | 12/2014 | Nakazawa et al. | |
| 2015/0070737 A1 | 3/2015 | Hirata et al. | |
| 2015/0085305 A1 | 3/2015 | Suzuki et al. | |
| 2015/0098117 A1 | 4/2015 | Marumoto et al. | |
| 2015/0109646 A1 | 4/2015 | Yokozawa et al. | |
| 2015/0116794 A1 | 4/2015 | Nakazawa | |
| 2015/0163378 A1 | 6/2015 | Konno et al. | |
| 2015/0222790 A1 | 8/2015 | Asaba et al. | |
| 2015/0304517 A1 | 10/2015 | Nakazawa et al. | |
| 2016/0003673 A1 | 1/2016 | Hashimoto et al. | |
| 2016/0006961 A1 | 1/2016 | Asaba et al. | |
| 2016/0088179 A1 | 3/2016 | Nakazawa et al. | |
| 2016/0100072 A1 | 4/2016 | Kobayashi et al. | |
| 2016/0112660 A1 | 4/2016 | Nakazawa et al. | |
| 2016/0119495 A1 | 4/2016 | Konno et al. | |
| 2016/0173719 A1 | 6/2016 | Hashimoto et al. | |
| 2016/0182753 A1 | 6/2016 | Takahashi et al. | |
| 2016/0268330 A1 | 9/2016 | Nakazawa et al. | |
| 2016/0277610 A1 | 9/2016 | Kishi et al. | |
| 2016/0295138 A1 | 10/2016 | Asaba et al. | |
| 2016/0373604 A1 | 12/2016 | Hashimoto et al. | |
| 2017/0019567 A1 | 1/2017 | Konno et al. | |
| 2017/0034392 A1 | 2/2017 | Suga et al. | |
| 2017/0163836 A1 | 6/2017 | Nakazawa | |
| 2017/0170225 A1 | 6/2017 | Asaba et al. | |
| 2017/0176908 A1 | 6/2017 | Kobayashi et al. | |
| 2017/0201700 A1 | 7/2017 | Hashimoto et al. | |
| 2017/0295298 A1 | 10/2017 | Ozaki et al. | |
| 2017/0302821 A1 | 10/2017 | Sasa et al. | |
| 2017/0324883 A1 | 11/2017 | Konno et al. | |
| 2018/0020108 A1 | 1/2018 | Nakayama et al. | |
| 2018/0141329 A1 | 5/2018 | Aoyagi et al. | |
| 2018/0141359 A1 | 5/2018 | Kawarada et al. | |
| 2018/0146150 A1 | 5/2018 | Shirado et al. | |
| 2018/0147835 A1 | 5/2018 | Nakamura et al. | |
| 2018/0157617 A1 | 6/2018 | Shibata et al. | |
| 2018/0175096 A1 | 6/2018 | Inoue et al. | |
| 2018/0213124 A1 | 7/2018 | Yokohama et al. | |

FOREIGN PATENT DOCUMENTS

| | | |
|---|---|---|
| JP | 10-093787 | 4/1998 |
| JP | H11-355513 A | 12/1999 |
| JP | 2004-042376 | 2/2004 |
| JP | 2004-349982 A | 12/2004 |
| JP | 2008-028737 | 2/2008 |
| JP | 2008-034950 | 2/2008 |
| JP | 2009-171171 A | 7/2009 |
| JP | 2010-173069 | 8/2010 |
| JP | 2011-151548 | 8/2011 |
| JP | 2012-088914 | 5/2012 |
| JP | 2015-128122 A | 7/2015 |
| JP | 2017-107101 A | 6/2017 |

OTHER PUBLICATIONS

Office Action dated Jun. 22, 2021 in Japanese Patent Application No. 2017-230846, 3 pages.

* cited by examiner

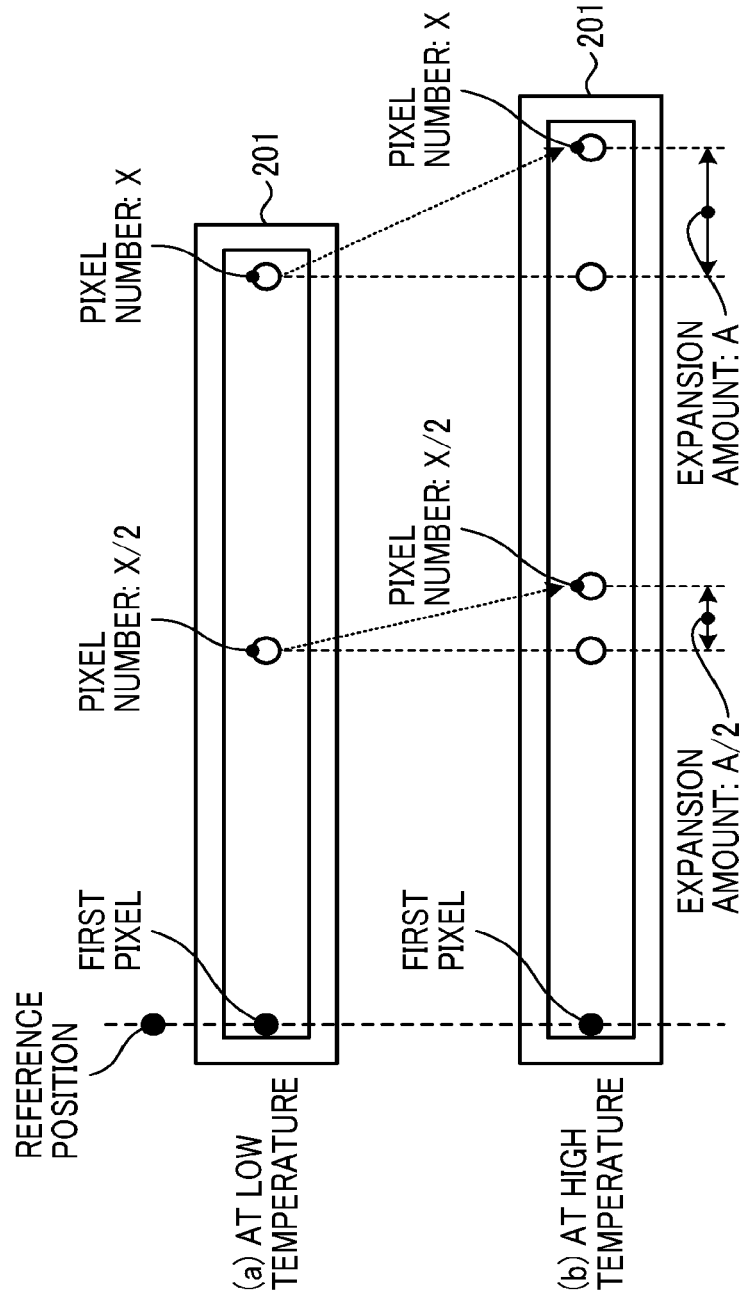

POSITION DETECTOR, IMAGE FORMING APPARATUS, POSITION DETECTING METHOD, AND NON-TRANSITORY RECORDING MEDIUM STORING POSITION DETECTING PROGRAM CODE

CROSS-REFERENCE TO RELATED APPLICATION

This patent application is based on and claims priority pursuant to 35 U.S.C. § 119 to Japanese Patent Application No. 2017-230846, filed on Nov. 30, 2017 in the Japanese Patent Office, the entire disclosure of which is hereby incorporated by reference herein.

BACKGROUND

Technical Field

The present disclosure relates to the position detector, an image forming apparatus, the position detecting method, and a non-transitory recording medium storing the position detecting program code.

Description of the Related Art

Conventionally, there is a disclosed technology in which a reading device such as a contact image sensor (CIS) reads an outer edge position of a conveyed object and a processing position of the conveyed object to correct a conveying position of the conveyed object and the processing position of the conveyed object.

SUMMARY

This specification describes an improved position detector. The position detector includes a reading device, a position reference member having a mark opposite the reading device, and circuitry. The circuitry controls the reading device to detect the contour of a processing target, the position of an image pattern on the processing target, and the position of the mark and corrects a processing position for the processing target to offset distortion of the reading device.

This specification further describes an improved position detecting method. The position detecting method includes detecting the position of a mark on a position reference member by a reading device, detecting a contour of a processing target and the position of a pattern on the processing target; and correcting a processing position for the processing target to offset distortion of the reading device based on the detected position of the mark, the detected contour of the processing target, and the detected position of the pattern on the processing target.

This specification still further describes a non-transitory computer-readable recording medium with an executable program code stored thereon, wherein the program code, when executed, instructs an apparatus to execute the position detecting method.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIG. 3A is a diagram illustrating a difference in rate of expansion of the reading device depending on the position in a main scanning direction;

Figure 1:
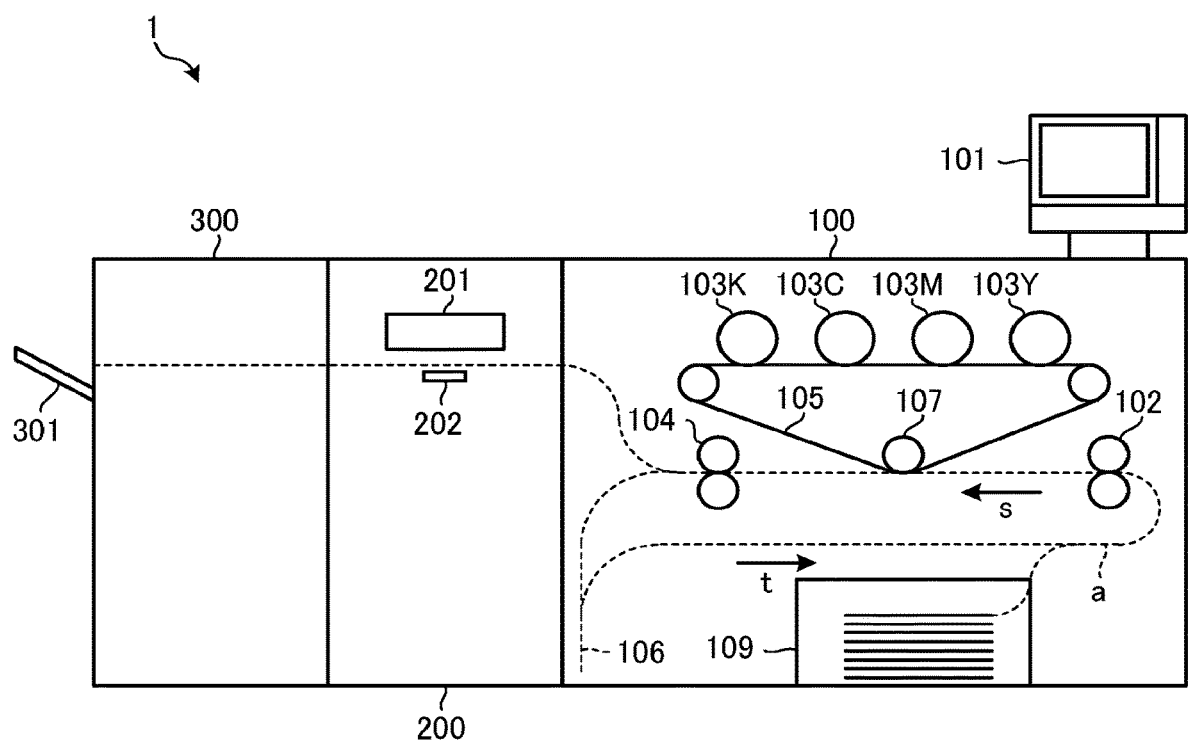
FIG. 1 is a schematic diagram illustrating an example of a hardware configuration of a printing system according to a first embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings illustrating the following embodiments, the same reference codes are allocated to elements (members or components) having the same function or shape and redundant descriptions thereof are omitted below.

A position detector, an image forming apparatus, a position detecting method, and a non-transitory computer readable recording medium storing position detecting program code according to embodiments of the present disclosure is described in detail below with reference to the accompanying drawings. In following descriptions, embodiments are described in which the position detector and the image forming apparatus are used in a printing system that includes a printer, such as a commercial printing apparatus called a production printing machine, and continuously prints a great number of sheets for a short time. However, the present disclosure is not limited to the above-described embodiments.

First Embodiment

Description of Hardware Configuration in the Printing System

FIG. 1 is a schematic diagram illustrating an example of a hardware configuration of the printing system according to the first embodiment. As illustrated in FIG. 1, the printing system 1 as an image forming apparatus includes the printer 100, a medium position detector 200 that is an example of the position detector, and a stacker 300.

The printer 100 includes an operation panel 101, image forming units 103Y, 103M, 103C, and 103K acting as a tandem type electrophotography machine, an intermediate transfer belt 105, a secondary transfer roller 107, a sheet feeder 109, a conveyance roller pair 102, a fixing roller 104, and a reverse path 106.

The operation panel 101 is an operation display unit to make input for various operations to the printer 100 and the medium position detector 200 and display various screens.

Each of the image forming units 103Y, 103M, 103C, and 103K executes an image forming process such as a charging process, an exposure process, a developing process, a transfer process, and a cleaning process to form a toner image and transfer the toner image onto the intermediate transfer belt 105. In the present embodiment, the image forming unit 103Y forms a yellow toner image, the image forming unit 103M forms a magenta toner image, the image forming unit 103C forms a cyan toner image, and the image forming unit 103K forms a black toner image, but the present disclosure is not limited to this.

The intermediate transfer belt 105 conveys a full color toner image that is formed by superimposing the toner image transferred from each of the image forming units 103Y, 103M, 103C, and 103K to a secondary transfer position of the secondary transfer roller 107. In the present embodiment, the yellow toner image is firstly transferred onto the intermediate transfer belt 105, and, subsequently, the magenta toner image, the cyan toner image, and the black toner image are sequentially transferred and superimposed onto the intermediate transfer belt 105, but the present disclosure is not limited to this.

The sheet feeder 109 accommodates a plurality of recording media to be processed and conveyed in a stacked manner. The sheet feeder 109 feeds the recording medium. The recording medium is, for example, a recording paper, but is not limited to this, and may be an image recordable medium such as coated paper, a cardboard, an overhead projector (OHP) sheet, a plastic film, prepreg, a copper foil.

The conveyance roller pair 102 conveys the recording medium fed by the sheet feeder 109 in the direction of arrow s on a conveying path a.

The secondary transfer roller 107 collectively transfers the full color toner image conveyed by the intermediate transfer belt 105 onto the recording medium conveyed by the conveyance roller pair 102 at the secondary transfer position.

The fixing roller 104 applies heat and pressure to the recording medium onto which the full-color toner image is transferred, thereby fixing the full-color toner image to the recording medium.

In the case of one-side printing, the printer 100 ejects the recording medium with the fixed full-color toner image to the medium position detector 200. In the case of two-sided printing, the printer 100 conveys the recording medium with the fixed full-color toner image to the reverse path 106.

The reverse path 106 causes the conveyed recording medium to be switched back such that the front side and the back side of the recording medium are inverted and conveys the recording medium in the direction of arrow t. The recording medium conveyed by the reverse path 106 is conveyed again by the conveyance roller pair 102, transferred a full-color tonner image on the side of the recording medium opposite to the side in the previous time by the secondary transfer roller 107, fixed the image by the fixing roller 104, and conveyed as a print to the medium position detector 200 and the stacker 300.

The medium position detector 200 disposed at a downstream from the printer 100 includes a reading device 201 and a position reference member 202.

The reading device 201 can be implemented as, for example, a contact image sensor (CIS) in which a plurality of imaging elements such as CMOS image sensors are arranged in a line. The reading device 201 receives a light reflected from an object to be read and outputs an image signal. Specifically, the reading device 201 reads the conveyed position of the recording medium sent from the printer 100 and a processing position such as a printed position of the recording medium. Additionally, the reading device 201 reads the position reference member 202.

The medium position detector 200 ejects the read recording medium to the stacker 300.

The stacker 300 includes a tray 301. The stacker 300 stacks the recording medium ejected by the medium position detector 200 on the tray 301.

The reading device 201 and the position reference member 202 in the medium position detector 200 are described.

Figure 2:
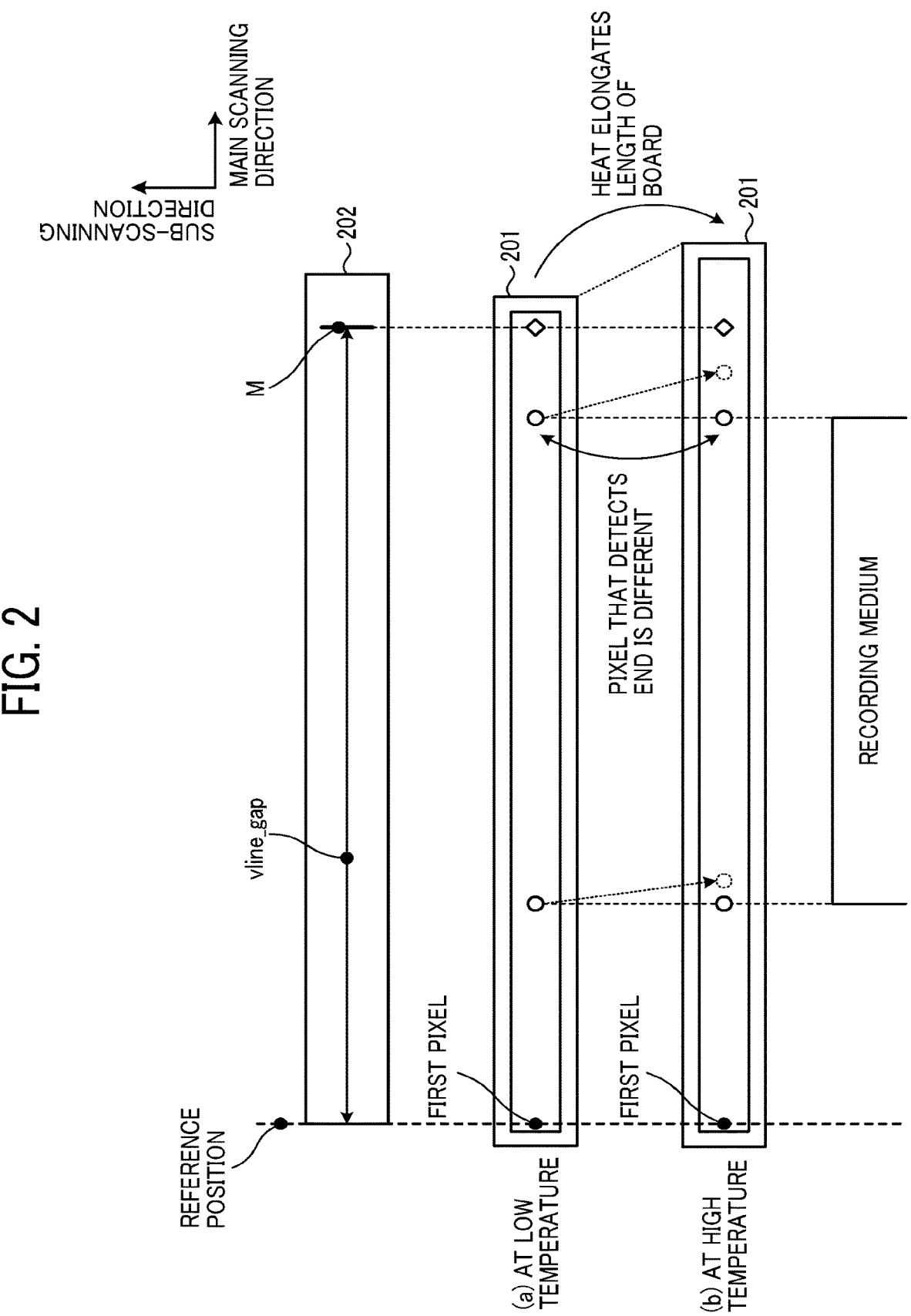
FIG. 2 is a diagram illustrating relative positions of a reading device and a position reference member in a medium position detector.

FIG. 2 is a diagram illustrating relative positions of the reading device 201 and the position reference member 202 in the medium position detector 200. FIG. 2 illustrates (a) the reading device at a low temperature and (b) the reading device at a high temperature. As illustrated in FIG. 2, the position reference member 202 is supported at the position corresponding to a first pixel that is an imaging element at an end (a leading end) of the reading device 201 in the main scanning direction at the low temperature. This position becomes a reference position and a support position of the position reference member 202.

The reading device 201 is also supported at the position corresponding to the first pixel and the reference position of the position reference member 202. This position becomes a reference position and a support position of the reading device 201.

As illustrated in FIG. 2, the high temperature due to self-heating and an increase in ambient temperature causes distortion of the reading device, that is, the reading device 201 expands in the main scanning direction. Therefore, pixel numbers of the reading device 201 that are used to detect a conveyed position of the recording medium and a print position of the recording medium differ between low temperature and high temperature, resulting in errors in results read by the reading device 201.

Figure 3B:
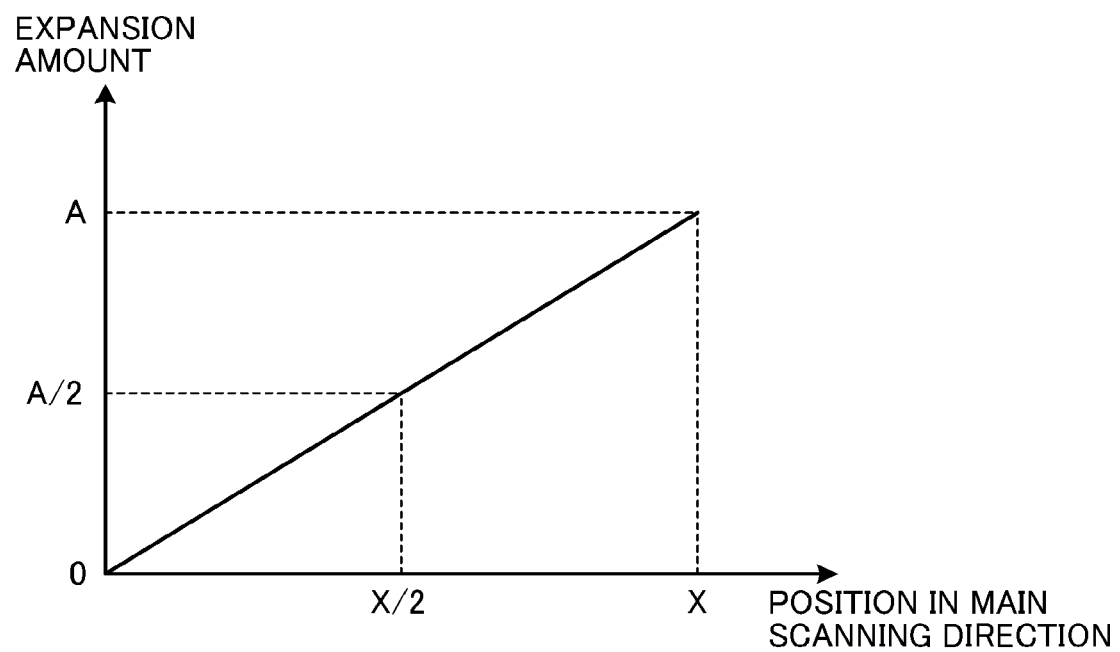
FIG. 3B is a graph illustrating the expansion amount of the reading device depending on the position in the main scanning direction.

FIG. 3A is a diagram illustrating a difference in expansion amount of the reading device 201 depending on the position in the main scanning direction. Here, it is assumed that the expansion amount, that is, change amount regarding the pixels of the reading device 201 is uniform in the main scanning direction. Under the above assumption, as illustrated in FIGS. 3A and 3B, when the expansion amount with reference to the reference position regarding the pixel of the reading device 201 under a certain temperature change from low temperature to high temperature is expressed by the expansion amount A at pixel number X, the expansion amount at pixel number X/2 becomes A/2. In other words, the cumulative error due to thermal expansion becomes larger toward the other end that is a rear end in the main scanning direction, and detection accuracy also deteriorates, that is, the error increases.

Therefore, as illustrated in FIG. 2, the position reference member 202 includes a mark M at the position corresponding to a last pixel that is the imaging element at the other end (a rear end) of the reading device 201 in the main scanning direction at low temperature. In the present embodiment, the mark M on the position reference member 202 is a vertical line, but a shape other than the vertical line such as a round shape may be used as long as the position can be specified by the reading device 201. The distance from the reference position, which is the support point, to the mark M in the position reference member 202 is under dimensional control and is defined as a known vline_gap [mm].

The mark M marked on the position reference member 202 is disposed at the position in which the reading device 201 can correct the error in the main scanning direction. Providing the mark M at a suitable position on the position reference member 202 based on the expansion due to temperature change of the reading device 201 enables accurate detection of the position of the end of the recording medium and the position of an image pattern.

If the position reference member 202 expands or contracts due to the heat generation or the like of the peripheral member, the position reference member 202 does not function as an absolute position reference and thus causes deterioration of the position detection accuracy. Therefore, the position reference member 202 is made of a material whose linear expansion coefficient is lower than a material of a board of the reading device 201 and whose expansion amount due to the ambient temperature is negligible in position detection. In the present embodiment, the position reference member 202 is made of glass in consideration of an assumed temperature change range and linear expansion coefficient. However, the material of the position reference member 202 is not limited to this and it is preferable to use quartz glass or the like to perform highly accurate medium position detector when the temperature variation range of the reading device 201 is wide.

Figure 4:
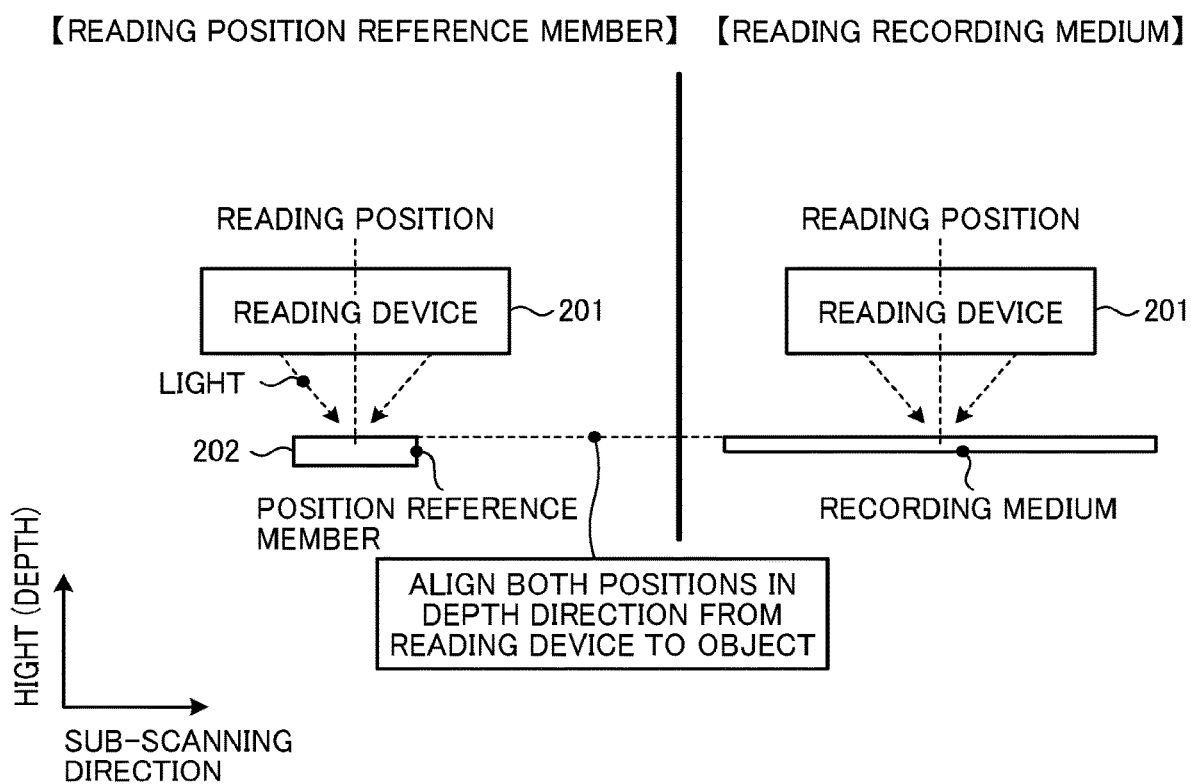
FIG. 4 is a diagram illustrating relative positions in a depth direction of the position reference member and the reading device.

FIG. 4 is a diagram illustrating relative positions in a depth direction of the position reference member 202 and the reading device 201. The reading device 201 such as the CIS generally has a characteristic that image characteristics change depending on the height (depth) direction. Typical examples of such image characteristics are Modulation Transfer Function (MTF), depth of focus, and depth of lighting.

In addition to the height dependency, that is, the depth dependency, some of the reading devices 201 may have different characteristics depending on the position in the main scanning direction.

Therefore, in the present embodiment, the position reference member 202 and the reading device 201 are arranged so that the position of the recording medium in the depth direction (that is the height direction) at which the reading device 201 reads the recording medium and the position of the position reference member 202 in the depth direction, (that is the height direction), at which the reading device 201 reads the mark M on the position reference member 202 coincide with each other. This greatly reduces the effects of the image characteristic difference of the reading device 201 depending on the depth direction and makes it possible to improve the accuracy of position detection.

Figure 5:
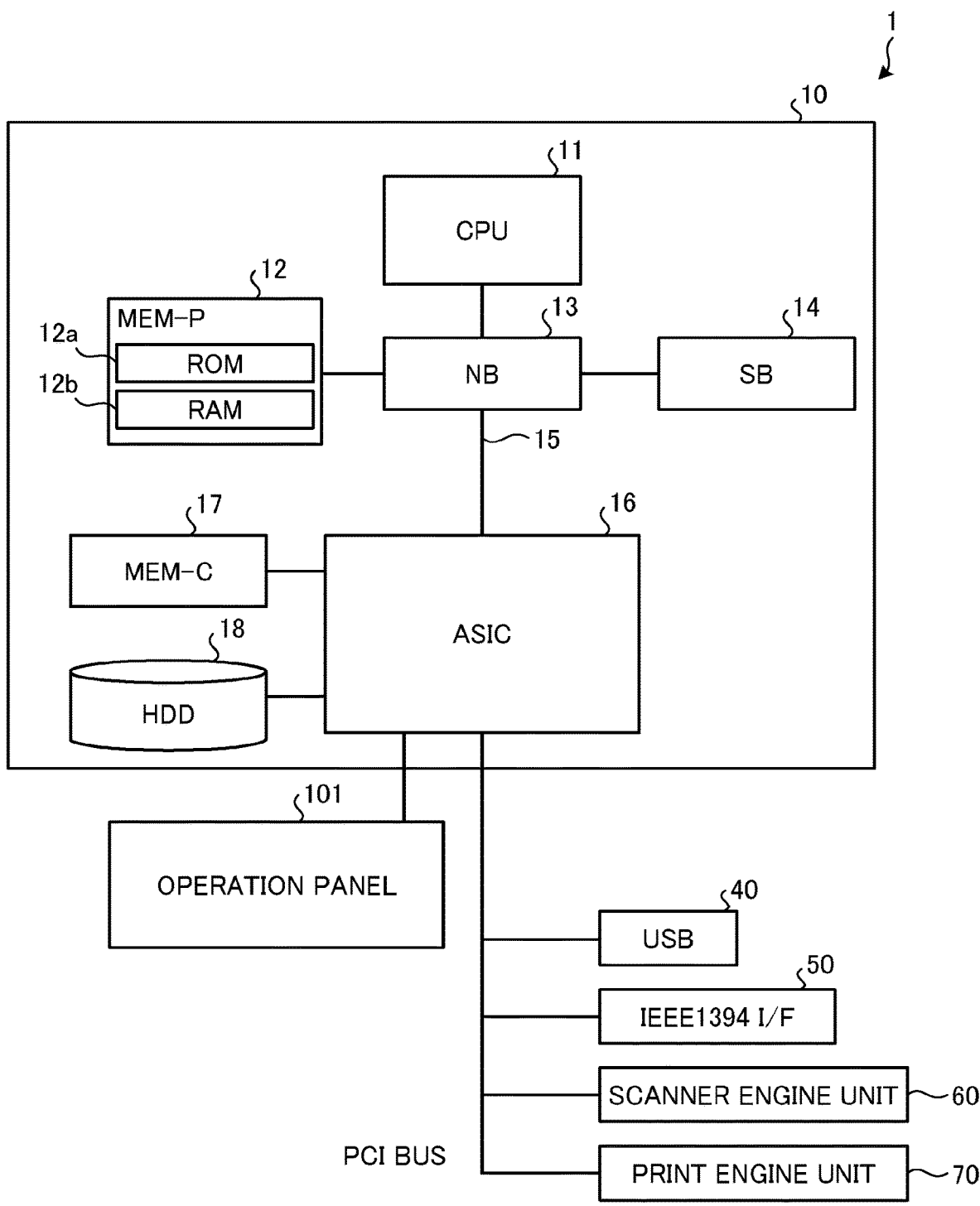
FIG. 5 is a block diagram illustrating an example of electrical connections in hardware of the printing system.

FIG. 5 is a block diagram illustrating an example of electrical connections in hardware of the printing system 1.

As illustrated in FIG. 5, the printing system 1 has a configuration in which a controller 10, a scanner engine unit 60 and a print engine unit 70 are connected via a PCI bus. The controller 10 controls all operations of the printing system 1 such as drawing, communication, and input from the operation panel 101 which is an operation display unit. The scanner engine unit 60 is an engine unit connectable to the PCI bus. Examples of the scanner engine unit 60 include a scanner engine unit such as the reading device 201. The scanner engine unit 60 includes also an image processing section such as an error diffusion section and a gamma conversion section in addition to an engine section. The print engine unit 70 is an engine unit connectable to the PCI bus, and is, for example, a print engine unit such as a plotter including the image forming units 103 Y, 103 M, 103 C, and 103 K.

The controller 10 includes a central processing unit (CPU) 11, a north bridge (NB) 13, a system memory (MEM-P) 12, a south bridge (SB) 14, a local memory (MEM-C) 17, an Application Specific Integrated Circuit (ASIC) 16, and a HDD 18, and the north bridge (NB) 13 and the ASIC 16 are connected to each other through an Accelerated Graphics Port (AGP) bus 15. In addition to the above-mentioned, the MEM-P 12 further includes a read only memory (ROM) 12a and a random-access memory (RAM) 12b.

The CPU 11 controls entire operations of the printing system 1 and is connected with the other devices through a chip set including the NB 13, the MEM-P 12, and the SB 14.

The NB 13 is a bridge for connecting the CPU 11 and the MEM-P 12, the SB 14, and the AGP bus 15 and has a memory controller for controlling read and write operations from and to the MEM-P 12, a PCI master, and an AGP target.

The MEM-P 12 is a system memory that is used as, for example, a memory storing a program and data, a working memory for a program or data, or a memory for drawing with a printer, and includes the ROM 12a and the RAM 12b. The ROM 12a is a memory dedicated for reading data and used as the memory for storing the program and the data, and the RAM 12b is a memory that can write and read data and is used as the memory for developing the program and the data and as the drawing memory of the printer.

The SB 14 is a bridge that connects the NB 13, PCI devices, and peripheral devices. The SB 14 is connected to the NB 13 via the PCI bus which is also connected with a network interface (I/F) section and the like.

The ASIC 16 is an Integrated Circuit (IC) that has a hardware element, is used to image processing, and has a role as a bridge for connecting the AGP bus 15, the PCI bus, the HDD 18, and the MEM-C 17, respectively. The ASIC 16 includes a PCI target, an AGP master, an arbiter (ARB), which is a core of the ASIC 16, a memory controller that controls the MEM-C 17, a plurality of direct memory access controllers (DMACs) capable of rotating image data with a hardware logic, and a PCI unit that transfers data with the scanner engine unit 60 and the print engine unit 70 through the PCI bus. The ASIC 16 connects to a universal serial bus (USB) 40 and an Institute of Electrical and Electronics Engineers (IEEE) 1394 interface (I/F) 50 via the PCI bus. The operation panel 101 is directly connected to the ASIC 16.

The MEM-C 17 is a local memory used as an image buffer for copy and a code buffer, and the HDD 18 is a storage to store image data, a program, font data, and a form.

The AGP bus 15 is a bus interface for a graphics accelerator card that is devised to accelerate graphic processing and accelerates operation of the graphics accelerator card by directly accessing the MEM-P 12 with high throughput.

The program performed in the printing system 1 according to the present embodiment may also be configured to be provided in a manner recorded in a computer-readable recording medium such as a compact-disk read-only memory (CD-ROM), a flexible disk (FD), a compact disk recordable (CD-R), or a digital versatile disk (DVD), as a file in an installable or an executable format.

Furthermore, the program executed in the printing system 1 of the present embodiments may be configured to be provided as being stored on a computer connected to a network, such as the Internet, and then being downloaded through the network. Also, the program executed in the printing system 1 of the present embodiments may be provided or distributed through a network, such as the Internet.

Description of Functional Configuration of Printing System 1

A functional configuration of the printing system 1 is described. The CPU 11 executes the program stored in the HDD 18 and the ROM 12 and implements a function of the printing system 1.

Figure 6:
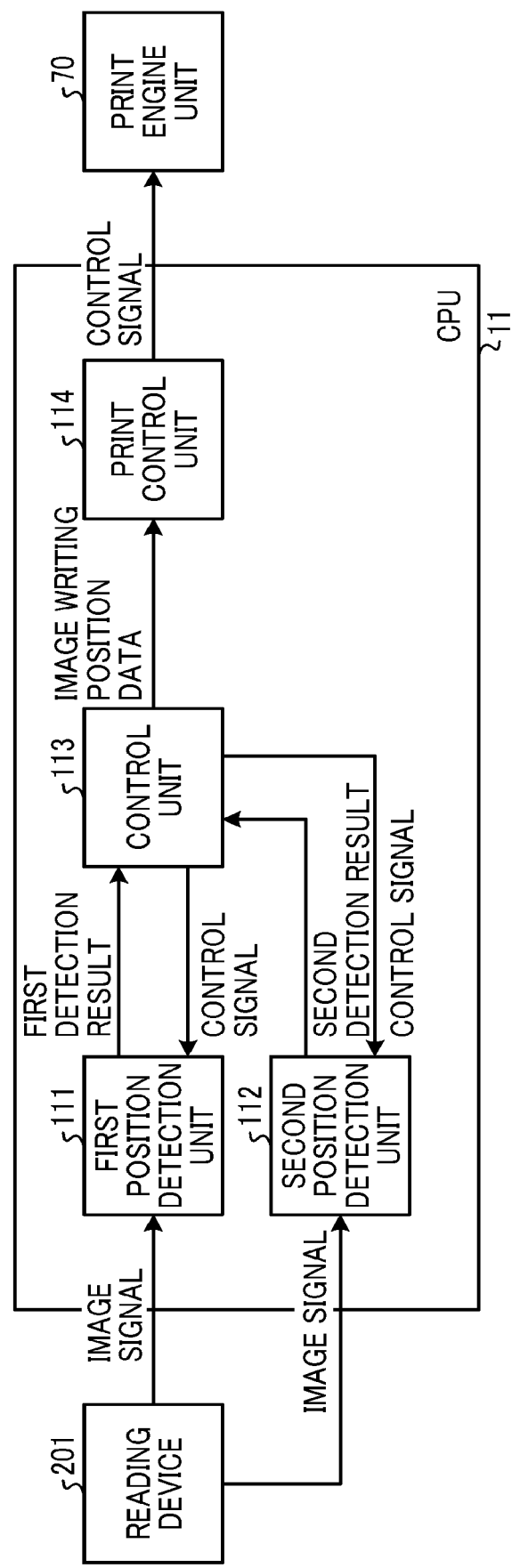
FIG. 6 is a functional block diagram illustrating functional components of the printing system.

FIG. 6 is a functional block diagram illustrating functional components of the printing system 1.

As illustrated in FIG. 6, the CPU 11 of the printing system 1 functions as a first position detection unit 111, a second position detection unit 112, a control unit 113, and a print control unit 114. It goes without saying that the CPU 11 may function as a conveyance control unit or the like to control conveyance of a recording medium in addition to the first position detection unit 111, the second position detection unit 112, the control unit 113, and the print control unit 114.

In the present embodiment, when the CPU executes the program, the printing system functions. However, the present disclosure is not limited to this. For example, a part or all of the functions of the above-described units may be implemented by a dedicated hardware circuit.

The first position detection unit 111 detects the contour of the recording medium and the position of the image pattern on the recording medium from the image read by the reading device 201 as a first detection result.

Figure 7:
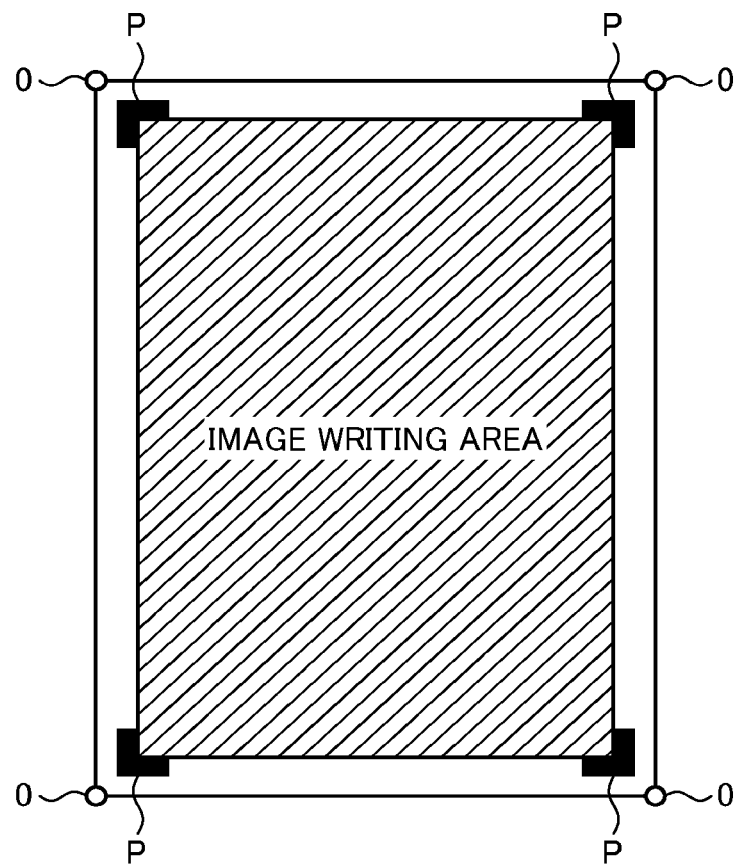
FIG. 7 is a diagram illustrating a contour of a recording medium and the position of an image pattern on the recording medium.

FIG. 7 is a diagram illustrating a contour of a recording medium and the position of an image pattern on the recording medium. As illustrated in FIG. 7, the first position detection unit 111 estimates the contour of the recording medium based on detection of the four corners of the recording medium which are referred as O in FIG. 7. The first position detection unit 111 estimates the position of the image pattern on the recording medium based on detecting positions of L-shaped image patterns P formed in the vicinities of the four corners O of the recording medium defining the image writing area.

As described above, the first position detection unit 111 sets the two detection results of the position of the recording medium, that is, the contour of the recording medium and the position of the image pattern as a first detection result.

The second position detection unit 112 detects, as a second detection result, the position of the mark M arranged on the position reference member 202 from the image read by the reading device 201.

Then, the control unit 113 detects a state of the reading device 201 based on the second detection result and holds the state as a correction parameter. Further, based on data from the imaging elements of the reading device 201 that outputs the first detection result and the second detection result, the control unit 113 detects the expansion amount of the reading device 201, that is, distortion of the reading device and corrects an image writing position which is a processing position on the recording medium to be processed.

Figure 8:
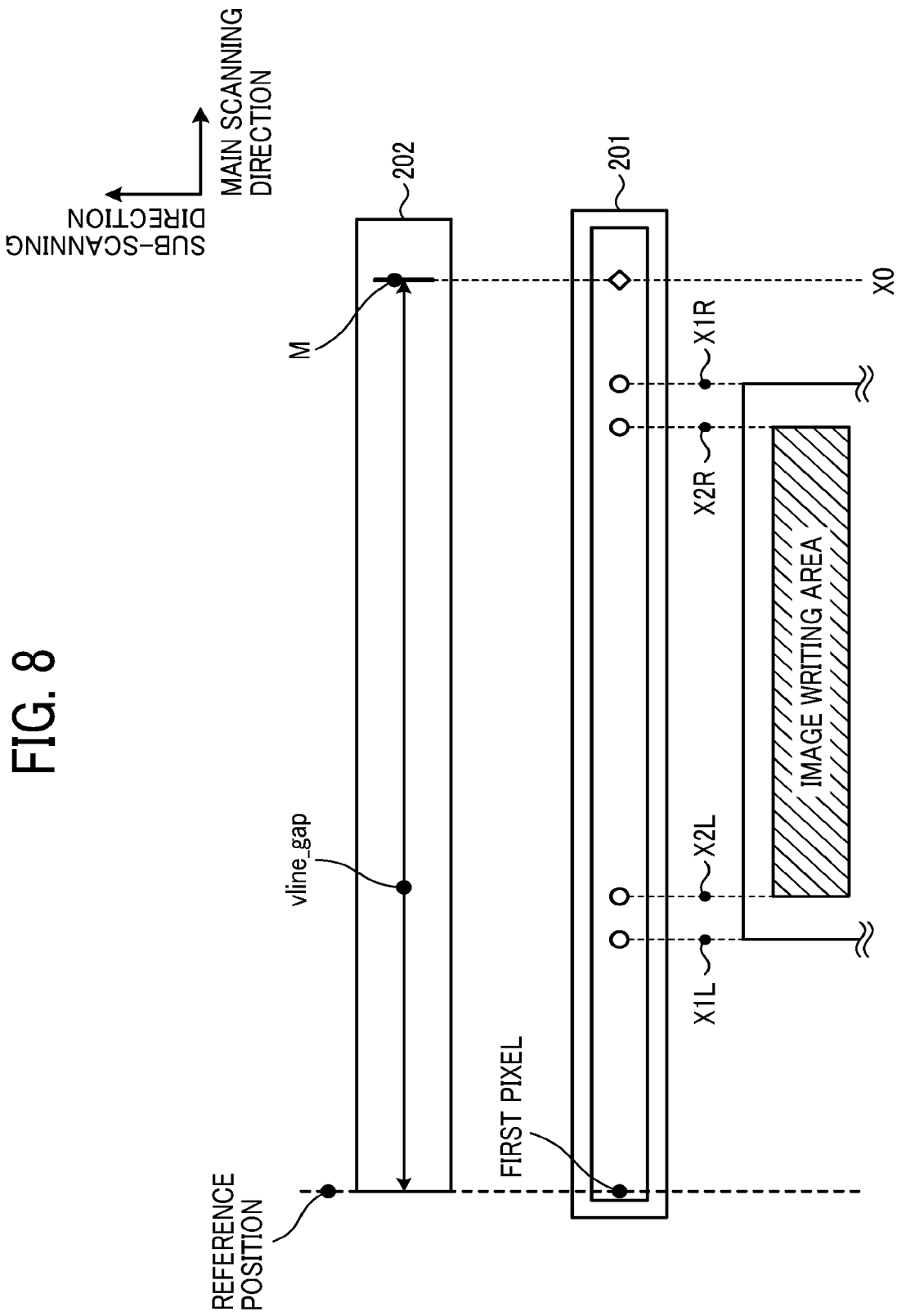
FIG. 8 is a diagram illustrating detection of a correction parameter.

FIG. 8 is a diagram illustrating detection of correction parameters.

As illustrated in FIG. 8, under standard environmental conditions, for example, at low temperature, the second position detection unit 112 detects the position of the mark M disposed on the position reference member 202 from the image read by the reading device 201 and detects the pixel number X0 (unit: dot) that corresponds to the position of the mark M as a correction parameter, which is the second detection result.

Subsequently, the first position detection unit 111 detects the contour of the recording medium and the position of the image pattern on the recording medium from the image read by the reading device 201 as a first detection result. The first detection result is expressed as follows.

A leading end position of the recording medium: X1L (unit: dot)

A rear end position of the recording medium: X1R (unit: dot)

A leading end position of image pattern: X2L (unit: dot)

A rear end position of the image pattern: X2R (unit: dot)

The control unit 113 calculates the physical length pix_w corresponding to one pixel of the imaging element in the reading device 201 using the correction parameter X0.

$$pix\_w = vline\_gap/X0 (unit:mm/dot)$$

The control unit 113 corrects the image writing position as the processing position for the recording medium by the following equation.

The position of an image with reference to the leading end in the recording medium in the main scanning direction is given by the following ΔXL.

$$\Delta XL = (X2L - X1L) \times pix\_w (unit:mm)$$

The position of an image with reference to the rear end in the recording medium in the main scanning direction is given by the following ΔXR.

$$\Delta XR = (X2L - X1L) \times pix\_w (unit:mm)$$

The control unit 113 outputs a control signal indicating the edge detection start timing to the first position detection unit 111 and the second position detection unit 112. The first position detection unit 111 and the second position detection unit 112 detect the contour of the recording medium and the position of the image pattern on the recording medium based on the detection start timing as a starting point and detect the position of the mark M disposed on the position reference member 202.

The control unit 113 converts the image writing position for the recording medium corrected by using the correction parameter X0 into image writing position data and transmits it to the print control unit 114.

The print control unit 114 controls the print engine unit 70 based on the image writing position data transmitted from the control unit 113 and executes a control of an image writing on the recording medium.

Transmission processing of the image writing position which the printing system executes is described below.

Figure 9:
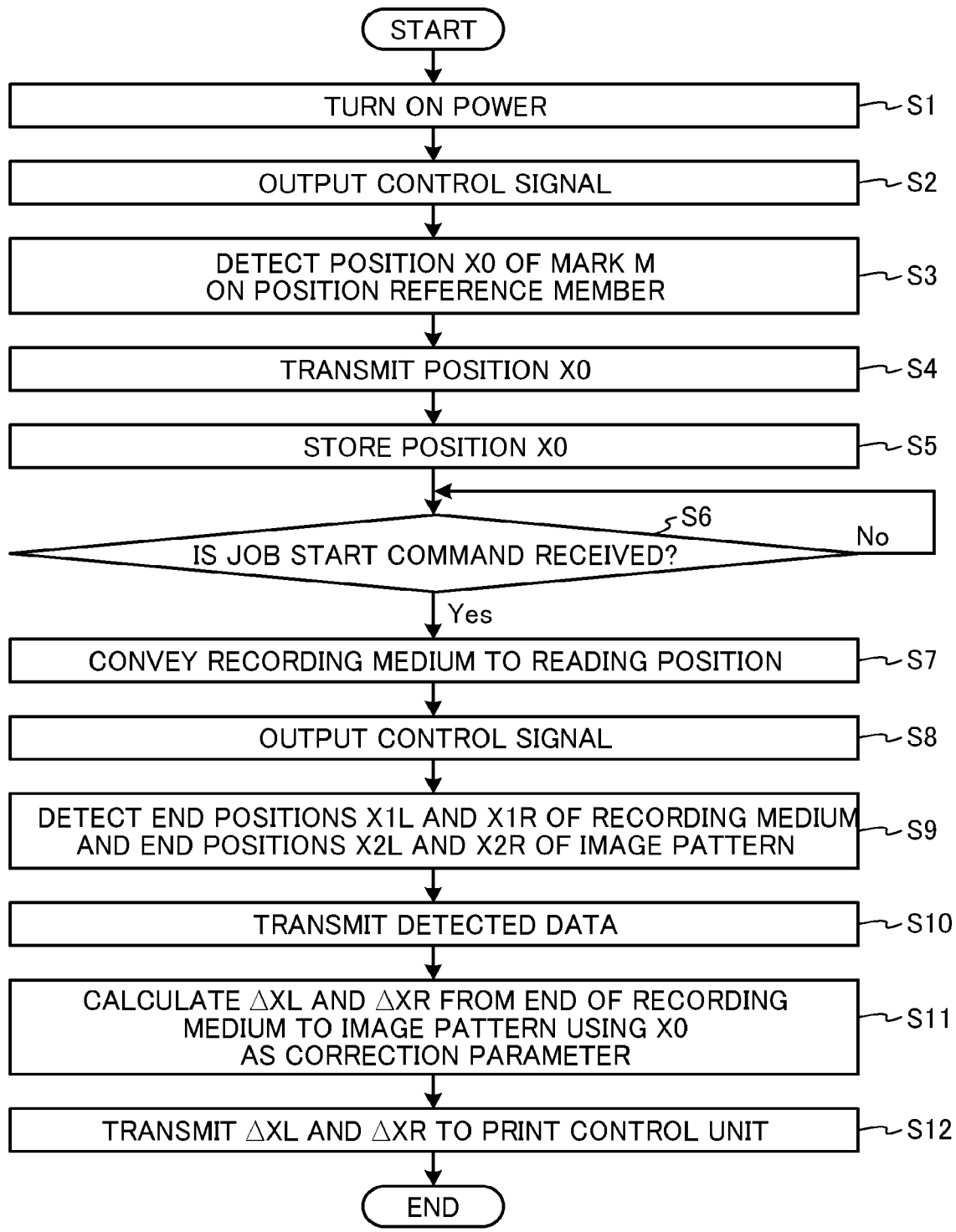
FIG. 9 is a flowchart illustrating transmission processing of an image writing position.

FIG. 9 is a flowchart illustrating the transmission processing of the image writing position. As illustrated in FIG. 9, in step S1, turning on a power starts power supply to the printing system 1, that is, the reading device 201 is activated, and the control unit 113 outputs a control signal to detect the position X0 of the mark M disposed on the position reference member 202 to the second position detection unit 112 in step S2.

In step S3, the second position detection unit 112 receives the control signal, controls the reading device 201 to read the mark M disposed on the position reference member 202, and detects the position X0 of the mark M. The position X0 of the mark M is detected to correspond to the mark M disposed on the position reference member 202.

The second position detection unit 112 transmits the position X0 of the mark M to the control unit 113 as a detection result in step S4.

The control unit 113 stores the transmitted position X0 of the mark M in the RAM 12b or the like as a memory in step S5.

Thereafter, the control unit 113 waits until receiving a job start command of the print job from the user (No in step S6).

Upon receiving the job start command of the print job (Yes in step S6), the control unit 113 conveys the recording medium on which the image pattern is printed to the reading position of the reading device 201 in step S7.

In step S8, the control unit 113 outputs a control signal to the first position detection unit 111 to detect the contour of the conveyed recording medium and the position of the image pattern on the recording medium.

In step S9, the first position detection unit 111 receives the control signal, controls the reading device 201 to read the contour of the conveyed recording medium and the position of the image pattern on the recording medium, and detects the contour of the recording medium and the position of the image pattern on the recording medium. Specifically, various positions written below are detected.

The leading end position of the recording medium: X1L (unit: dot)

The rear end position of the recording medium: X1R (unit: dot)

The leading end position of image pattern: X2L (unit: dot)

The rear end position of the image pattern: X2R (unit: dot)

In step S10, the first position detection unit 111 transmits the contour of the recording medium and the position of the image pattern on the recording medium to the control unit 113 as a detection result.

In step S11, using the X0 as the correction parameter, the control unit 113 calculates ΔXL and ΔXR, which are lengths from the end position of the recording medium to the end position of the image pattern.

In step S12, the control unit 113 converts ΔXL and ΔXR, which give image writing positions on the recording medium, into image writing position data and transmits the image writing position data to the print control unit 114.

As described above, according to the present embodiment, the position reference member 202 is set, the position of the mark M on the position reference member 202 is detected by the reading device 201, and the writing position is corrected, which can improve accuracy of detection about the following positions.

The position of the image pattern printed on the recording medium

The position of the outer edge of the recording medium

This makes it possible to reduce an error in the position detection result generated by expansion of the reading device 201, that is, the distortion of the reading device caused by heat generation.

Further, the position detection of the mark M on the position reference member 202 at each time of power on leads to periodical detection of the expansion state of the reading device 201 and periodically updating of the correction parameter. This can improve stabilization of detection accuracy.

In the present embodiment, the CIS, which is a so-called unmagnification optical system, is applied as the reading device 201, but it is not limited thereto. For example, the reading device 201 may be a reading device of a so-called reduction optical system including a light source, a plurality of reflecting members such as mirrors, an imaging lens, a linear image sensor, and the like. Any device which can detect the position of an object can improve the position detection accuracy.

Second Embodiment

Hereinafter, a description is given of a second embodiment of the present disclosure.

In the first embodiment, the expansion or contraction of the reading device 201 is assumed uniform in the main scanning direction, but the second embodiment handles a case in which the expansion or contraction of the reading device 201 may not be uniform in the main scanning direction. In the following description of the second embodiment, descriptions of the same parts as in the first embodiment is omitted, and the description mentioned below is focused on difference between the first embodiment and the second embodiment.

Figure 10A:
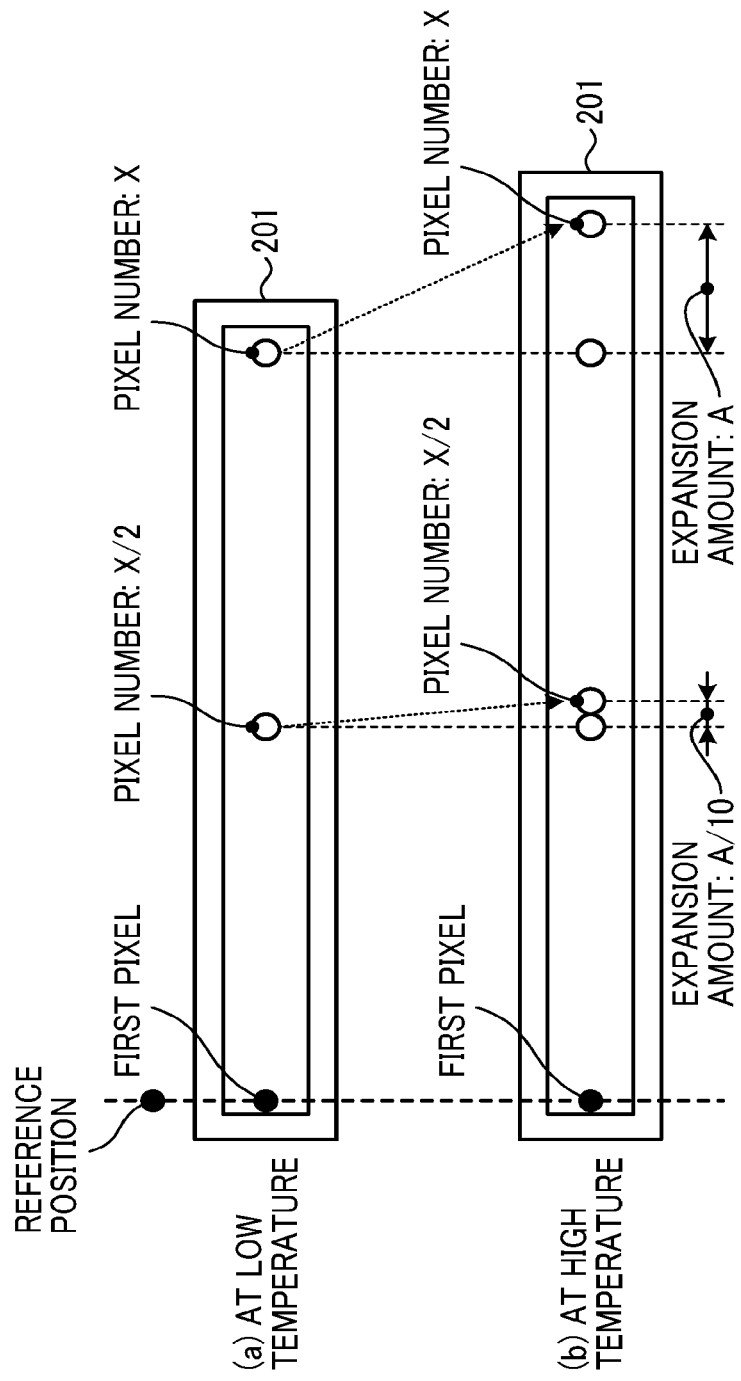
FIG. 10A is a diagram illustrating a difference in the rate of expansion of the reading device according to a second embodiment, depending on the position in the main scanning direction.
Figure 10B:
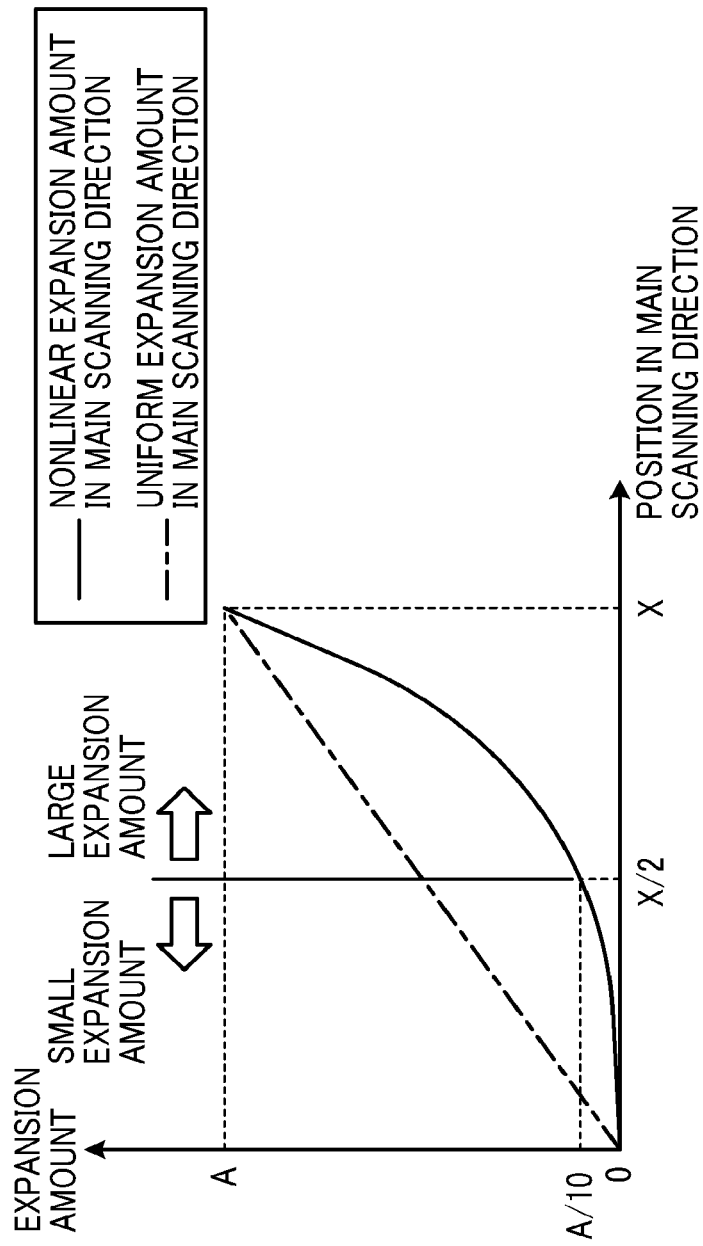
FIG. 10B is a graph illustrating the expansion amount of the reading device in the second embodiment, depending on the position in the main scanning direction.

FIG. 10A is a diagram illustrating a difference in the rate of expansion of the reading device 201, that is, distortion of the reading device according to a second embodiment depending on the position in the main scanning direction. In the example illustrated in FIG. 10B, an expansion amount of the pixel of the reading device 201 at the rear end in the main scanning direction becomes markedly larger than the one at the leading end. FIGS. 10A and 10B illustrates the example in which the expansion amount at a pixel number X/2 becomes A/10 when the expansion amount at the pixel number X is A.

Therefore, as a countermeasure of the example illustrated in FIGS. 10A and 10B, in the printing system 1 of the present embodiment, the reading device 201 is divided into a plurality of areas in the main scanning direction, as described below.

Figure 11:
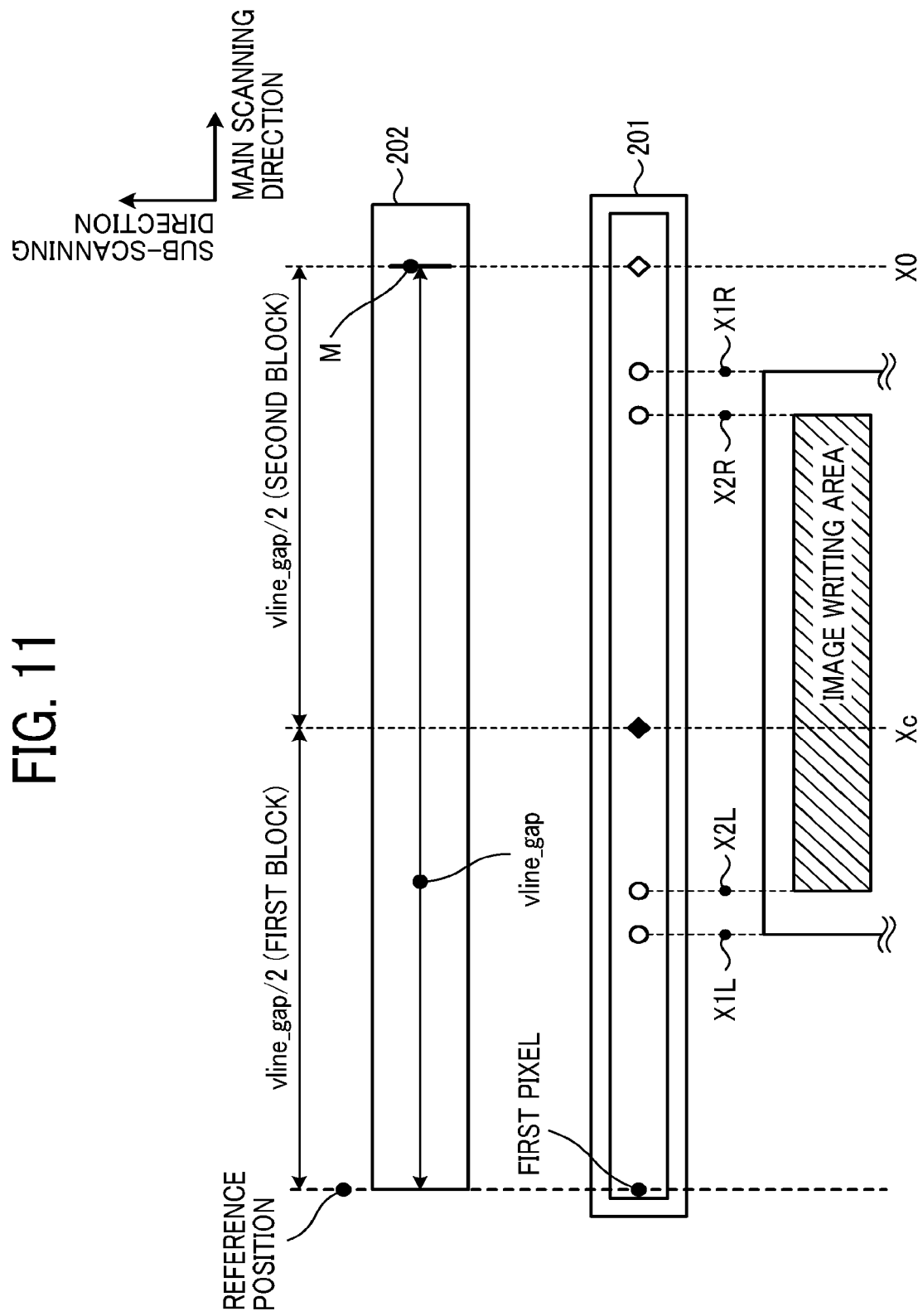
FIG. 11 is a diagram illustrating detection of correction parameters.

FIG. 11 is a diagram illustrating detection of a correction parameter. As illustrated in FIG. 11, under standard environmental conditions, for example, at low temperature, the second position detection unit 112 detects the position of the mark M disposed on the position reference member 202 from the image read by the reading device 201 and detects the pixel number X0 (unit: dot) that corresponds to the position of the mark M as a correction parameter, which is the second detection result.

Subsequently, the first position detection unit 111 detects the contour of the recording medium and the position of the image pattern on the recording medium from the image read by the reading device 201 as the first detection result. The first detection result is expressed as follows.

The leading end position of the recording medium: X1L (unit: dot)

The rear end position of the recording medium: X1R (unit: dot)

The leading end position of image pattern: X2L (unit: dot)

The rear end position of the image pattern: X2R (unit: dot)

The control unit 113 defines a pixel number corresponding to ½ of the distance vline_gap from the reference position to the mark M as Xc (fixed value) under a standard environment (for example, at low temperature).

The control unit 113 calculates the physical length pix_w (n) corresponding to one pixel of the imaging element in the reading device 201 using the correction parameter. The control unit 113 divides the main scanning area of the reading device 201 into n blocks and calculates pix_w (n) for each block. In this example, n indicates the block number (1 to N). In the example illustrated in FIG. 11, n is 2.

Based on a definition in which a standard value, that is, a representative value of the physical length corresponding to one pixel of imaging element in the reading device 201 is pix_w0 and an assumption in which the expansion amount due to the temperature change of 0 pixel to Xc pixel is minute, the control unit 113 calculates pix_w (1) by the following arithmetic expression.

$$\text{pix\_}w(1)=\text{pix\_}w0 \text{ (no change in the physical length of one sensor pixel)}$$

On the other hand, since the expansion amount due to the temperature change cannot be ignored in a range from the (Xc+1) pixel to the last pixel, the control unit 113 calculates pix_w (2) according to the following expression based on the position of the mark M.

$$\text{pix\_}w(2)=(\text{vline\_gap}/2)/(X0-Xc)$$

The control unit 113 corrects the image writing position on the recording medium by the following equation.

The position of the image with reference to the leading end in the recording medium in the main scanning direction is given by the following ΔXL.

$$\Delta XL=(X2L-X1L)\times\text{pix\_}w(1)(\text{unit:mm})$$

The position of the image with reference to the rear end in the recording medium in the main scanning direction is given by the following ΔXR.

$$\Delta XR=(X2L-X1L)\times\text{pix\_}w(2)(\text{unit:mm})$$

The control unit 113 converts the image writing position for the recording medium corrected by using the correction parameter into image writing position data and transmits it to the print control unit 114.

As described above, according to the present embodiment, changing the arithmetic expression according to the expansion caused by the temperature change of the reading device 201 can leads the high position detection accuracy. In the present embodiment, the main scanning area is divided into two, but the number of divisions may be increased.

Third Embodiment

Hereinafter, a description is given of a third embodiment of the present disclosure.

The third embodiment is different from the first embodiment and the second embodiment in that the reference position of the position reference member 202 is set at a point corresponding to a substantial center point of the reading device 201 in the main scanning direction at low temperature, and the substantial center point of the reading device 201 is the reference position and the support point of the reading device 201. In the following description of the third embodiment, descriptions of the same parts as in the first and second embodiments are omitted, and the description mentioned below is focused on difference between the two embodiments and the third embodiment.

Figure 12:
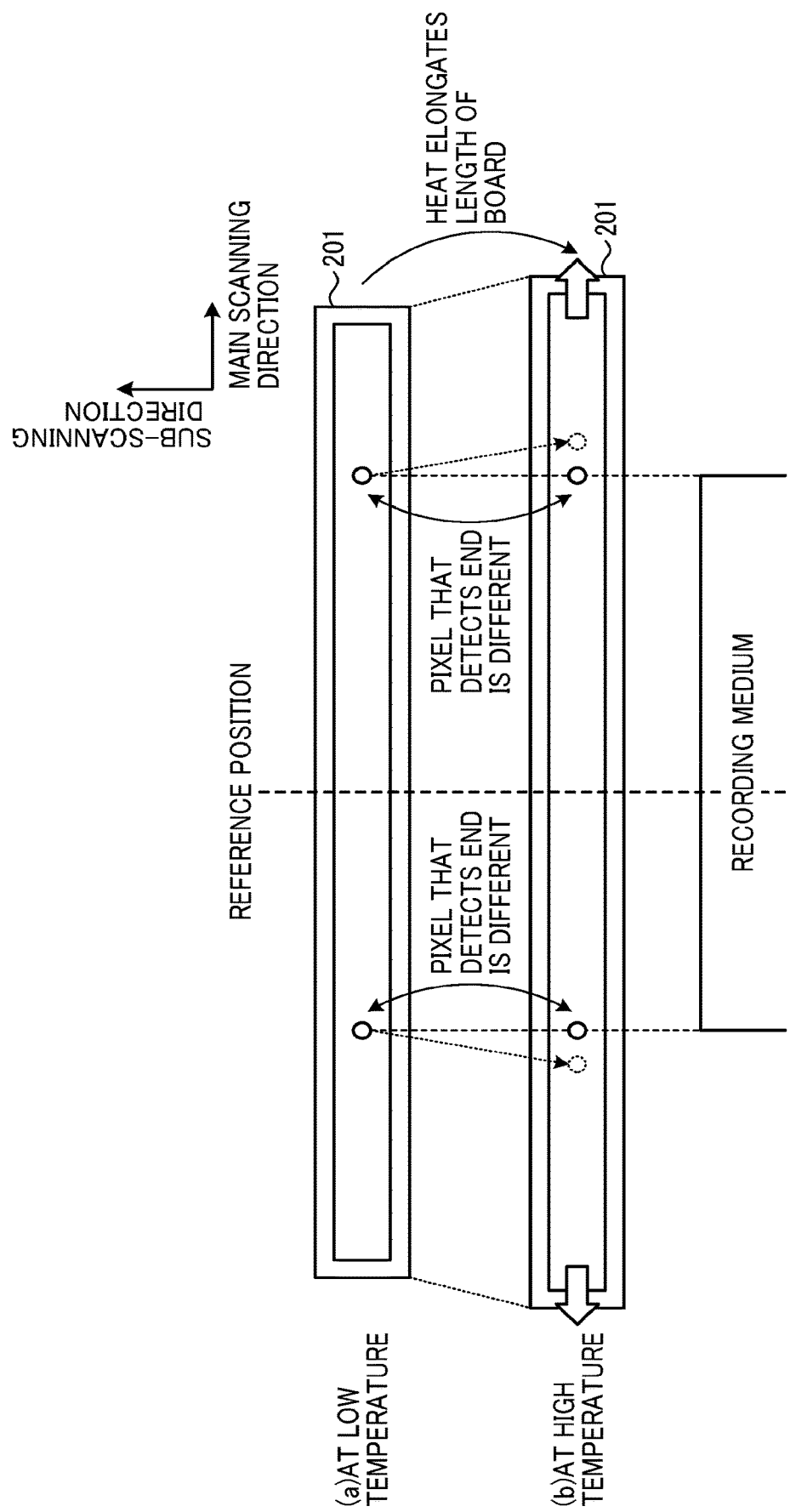
FIG. 12 is a diagram illustrating an installation example of the reading device according to a third embodiment.

FIG. 12 is a diagram illustrating an installation example of the reading device 201 according to the third embodiment. The configuration of the peripheral mechanical parts may cause a case in which the reference position described in the first embodiment and the second embodiment cannot be employed. In the installation example illustrated in FIG. 12, the reference position of the position reference member 202 is set at a point corresponding to a substantial center point of the reading device 201 in the main scanning direction at low temperature, and the substantial center point of the reading device 201 is the reference position and the support point of the reading device 201. As illustrated in FIG. 12, when the substantial center point of the reading device 201 is the reference position of the reading device 201 and the support point of the reading device 201, the board of the reading device 201 occurs the distortion and expands toward the leading end side and rear end side with respect to the reference position.

Figure 13:
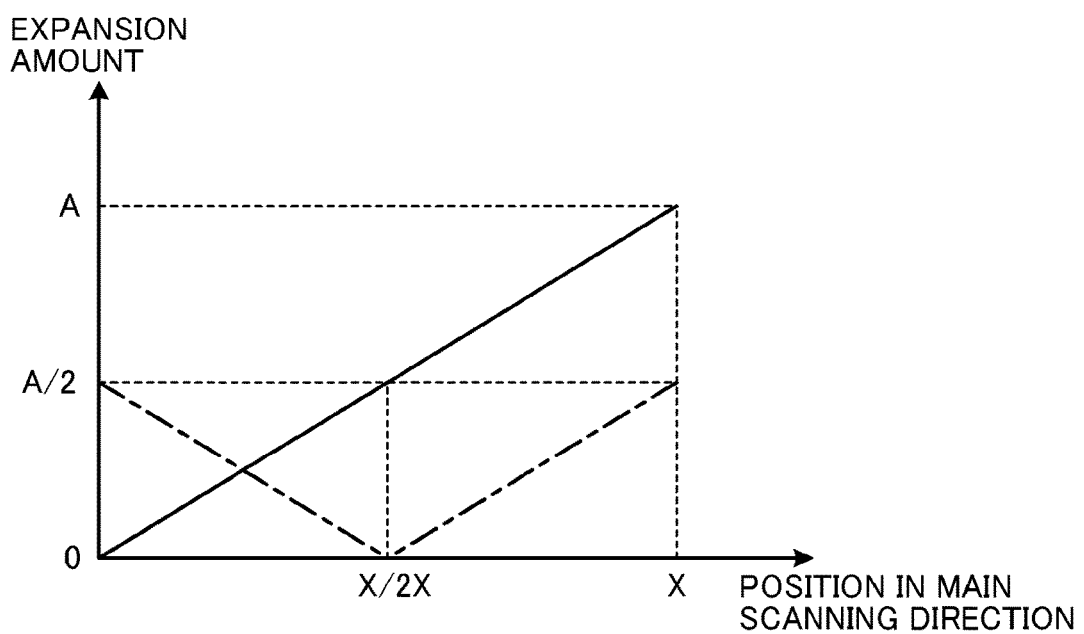
FIG. 13 is a diagram illustrating a difference in the rate of expansion of the reading device depending on the position in the main scanning direction.

FIG. 13 is a diagram illustrating a difference in the rate of expansion of the reading device depending on the position in the main scanning direction. FIG. 13 gives an outline of change in the length of the board of the reading device 201 in the main scanning direction from the low temperature to the high temperature in each of the case in which the reference position is at the leading end in the main scanning direction and the case in which the reference position is at the center in the main scanning direction. FIG. 13 illustrates an example in which the pixel number X/2 corresponding to ½ of the total pixel number X is used as a reference position.

As illustrated in FIG. 13, setting the reference position at the substantial center position X/2 in the main scanning direction leads to increases of the expansion amounts toward both the leading end side and the rear end side with respect to the substantial center position X/2.

Figure 14:
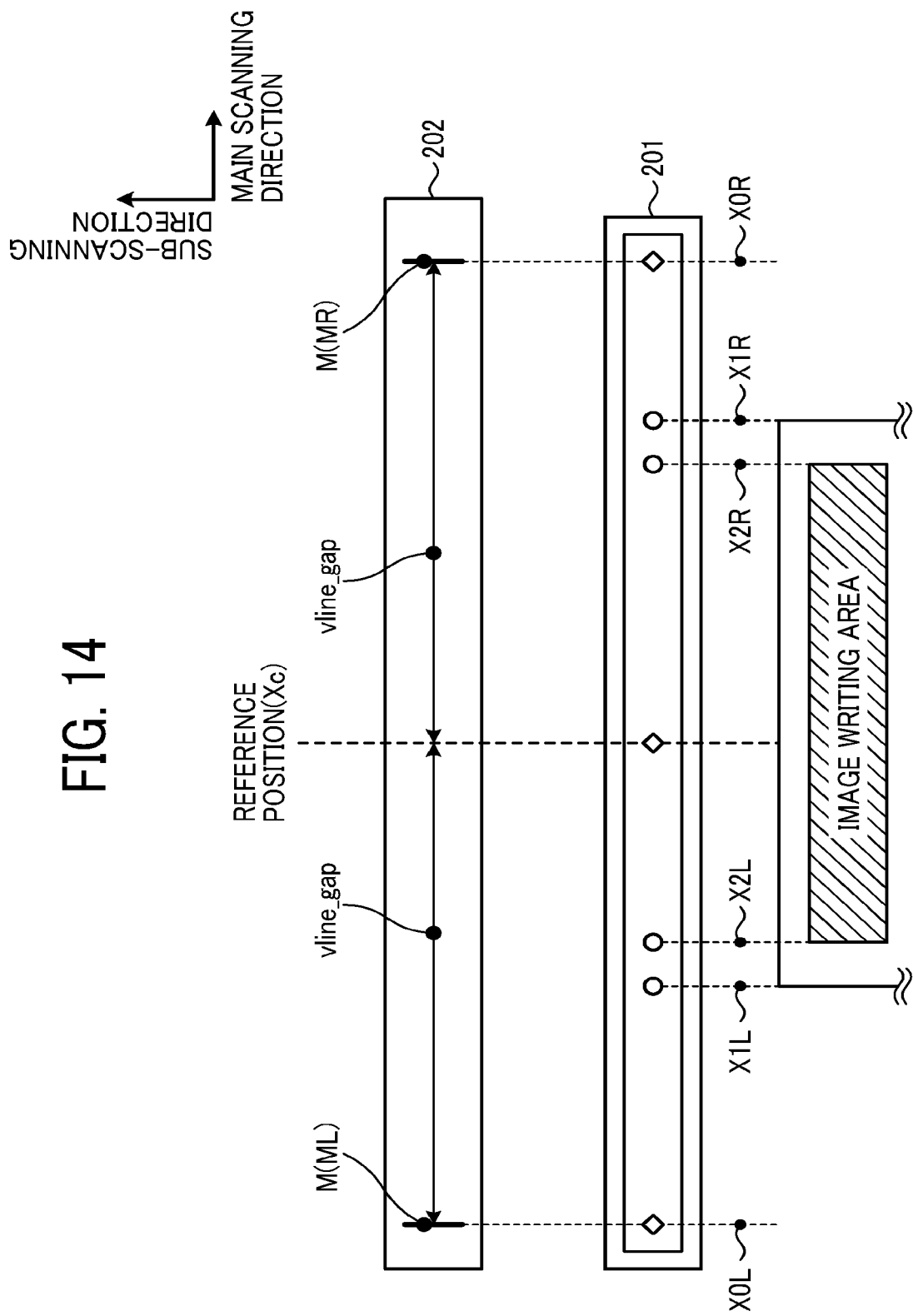
FIG. 14 is a diagram illustrating detection of correction parameters.

FIG. 14 is a diagram illustrating detection of correction parameters.

As a countermeasure of the expansion illustrated in FIG. 13, in the printing system 1 of the present embodiment, the reading device 201 is divided into a plurality of areas in the main scanning direction. In addition, the printing system 1 includes a mark ML disposed at the position on the position reference member 202 corresponding to a leading pixel of the imaging element at one end (that is the leading end) of the reading device 201 in the main scanning direction and a mark MR disposed at the position on the position reference member 202 corresponding to the rear pixel of the imaging element at the other end (that is the rear end) in the main scanning direction.

As illustrated in FIG. 14, under standard environmental conditions, for example, at low temperature, the second position detection unit 112 detects the position of the marks ML and MR disposed on the position reference member 202 from the image read by the reading device 201 and detects the pixel numbers X0L and X0R (unit: dot) that corresponds to the position of the marks ML and MR as correction parameters, which are the second detection results.

Subsequently, the first position detection unit 111 detects the contour of the recording medium and the position of the image pattern on the recording medium from the image read by the reading device 201 as the first detection result. The first detection result is expressed as follows.

The leading end position of the recording medium: X1L (unit: dot)

The rear end position of the recording medium: X1R (unit: dot)

The leading end position of image pattern: X2L (unit: dot)

The rear end position of the image pattern: X2R (unit: dot)

The control unit 113 calculates the physical length pix_w1 and pix_w2 corresponding to one pixel of the imaging element in the reading device 201 using the correction parameter. When the pixel number Xc of the reading device 201 corresponds to the reference position, the control unit 113 calculates pix_w1 and pix_w2 by the following expression.

The leading end side from the reference position in the main scanning direction $$pix\_w1 = vline\_gap/(Xc-X0L)(\text{unit:mm/dot})$$

The rear end side from the reference position in the main scanning direction $$pix\_w2 = vline\_gap/(X0R-Xc)(\text{unit:mm/dot})$$

The control unit 113 corrects the image writing position on the recording medium by the following equation.

The position of the image with reference to the leading end in the recording medium in the main scanning direction is given by the following ΔXL.

$$\Delta XL = (X2L-X1L) \times pix\_w1 (\text{unit:mm})$$

The position of the image with reference to the rear end in the recording medium in the main scanning direction is given by the following ΔXR.

$$\Delta XR = (X1R-X2R) \times pix\_w2 (\text{unit:mm})$$

As described above, according to the present embodiment, even when the reference position of attachment of the reading device 201 is located substantially at the center, providing the plurality of marks such as ML and MR at suitable positions on the position reference member 202 based on the expansion due to temperature change of the reading device 201 enables accurate detection of the position of the end of the recording medium and the image pattern.

Fourth Embodiment

Hereinafter, a description is given of a fourth embodiment of the present disclosure.

The fourth embodiment is different from the first embodiment to the third embodiment in that the position reference member 202 includes a plurality of marks M arranged at regular intervals, and each sensor chip on the board of the reading device 201 reads each mark M, respectively. In the following description of the fourth embodiment, descriptions of the same parts as in the first to third embodiments are omitted, and the description mentioned below is focused on difference between the three embodiments and the fourth embodiment.

Figure 15:
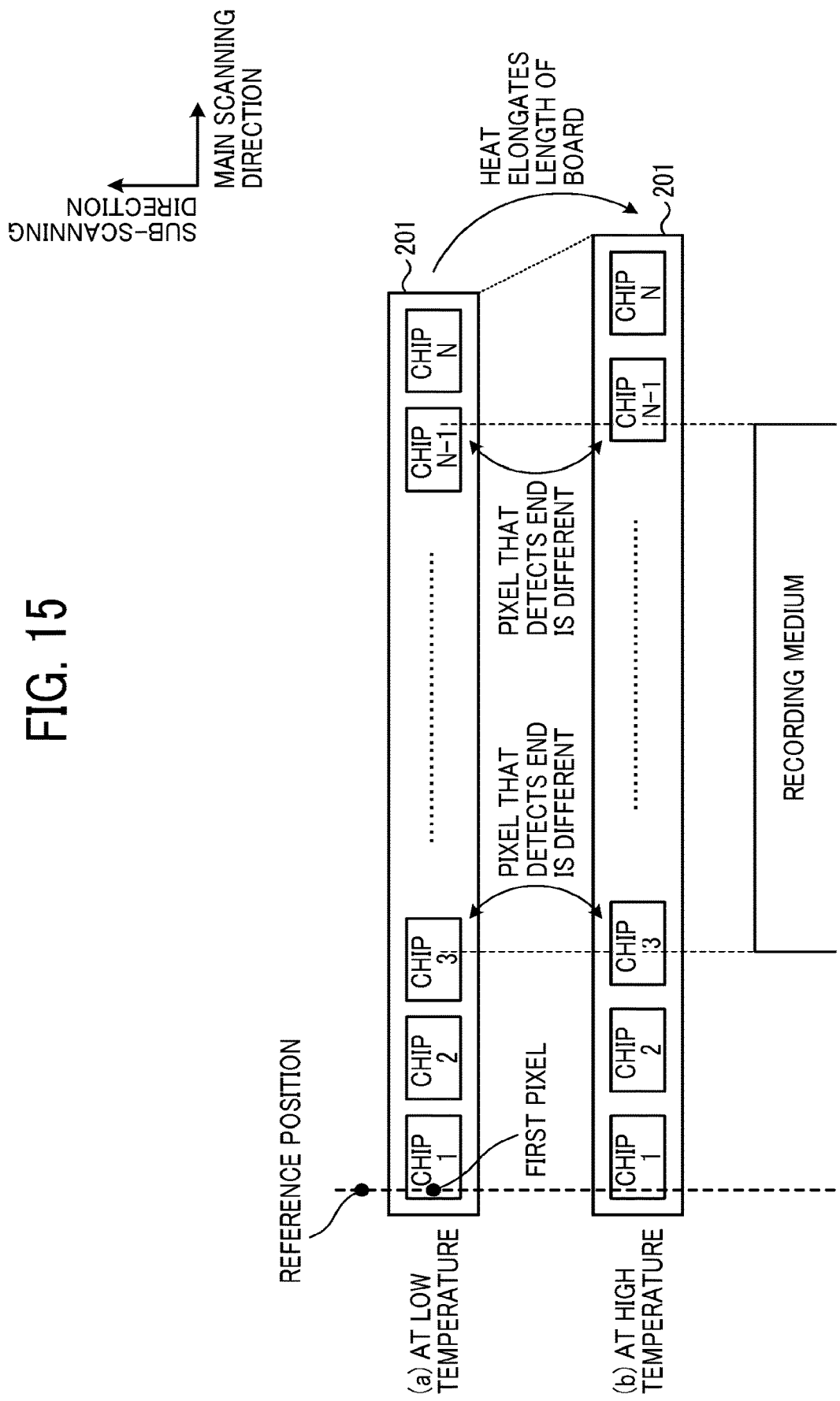
FIG. 15 is a diagram illustrating mounting positions of sensor chips of the reading device according to a fourth embodiment.

FIG. 15 is a diagram illustrating mounting positions of the sensor chips of the reading device 201 according to the fourth embodiment. As illustrated in FIG. 15, the CIS applied to the reading device 201 generally has a configuration in which a plurality of sensor chips having a plurality of pixels are arranged in the main scanning direction to obtain the necessary effective reading length in the main scanning direction.

Figure 16:
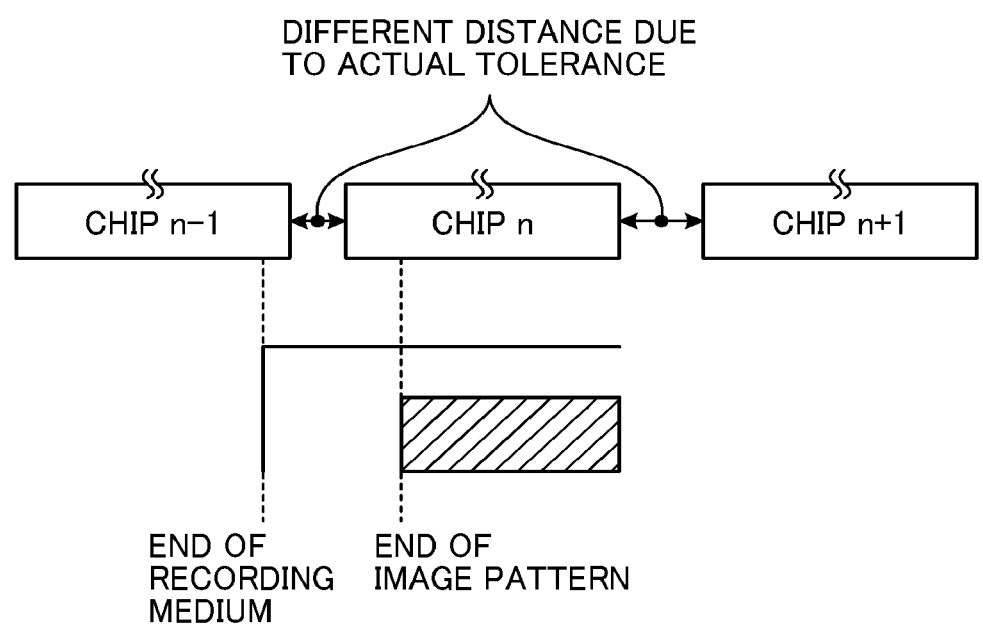
FIG. 16 is a diagram illustrating an issue regarding the sensor chips of the reading device.

An issue when applying CIS to the reading device 201 is described with respect to FIG. 16, which is a diagram illustrating the issue regarding the sensor chips of the reading device 201. As illustrated in FIG. 16, an interval between neighboring sensor chips is generally a predetermined physical length such as one pixel but has a tolerance. As illustrated in FIG. 16, the intervals between neighboring sensor chips on the reading device 201 are not necessarily equal. Therefore, as illustrated in FIG. 16, the case in which one of the neighboring sensor chips detects the leading end position of the recording medium and the other of the neighboring sensor chips detects the leading end position of the image pattern has an issue that the interval between neighboring sensor chips is uncertain and varies.

Furthermore, the board on which the sensor chip is mounted generally has a plurality of semiconductor parts to control and drive the sensor chips, and an arrangement (that is, layout) of the parts on the board and a difference in self heating values of the part does not make the heating distribution of the entire board uniform. Therefore, the expansion amount of the reading device 201 depending on the position in the main scanning direction is not uniform, which may cause variation of the expansion amount of the interval between the neighboring sensor chips on the reading device 201.

In consideration of the above-described issue, that is, the position detection error factor, the following configuration is considered to improve the position detection accuracy.

Figure 17:
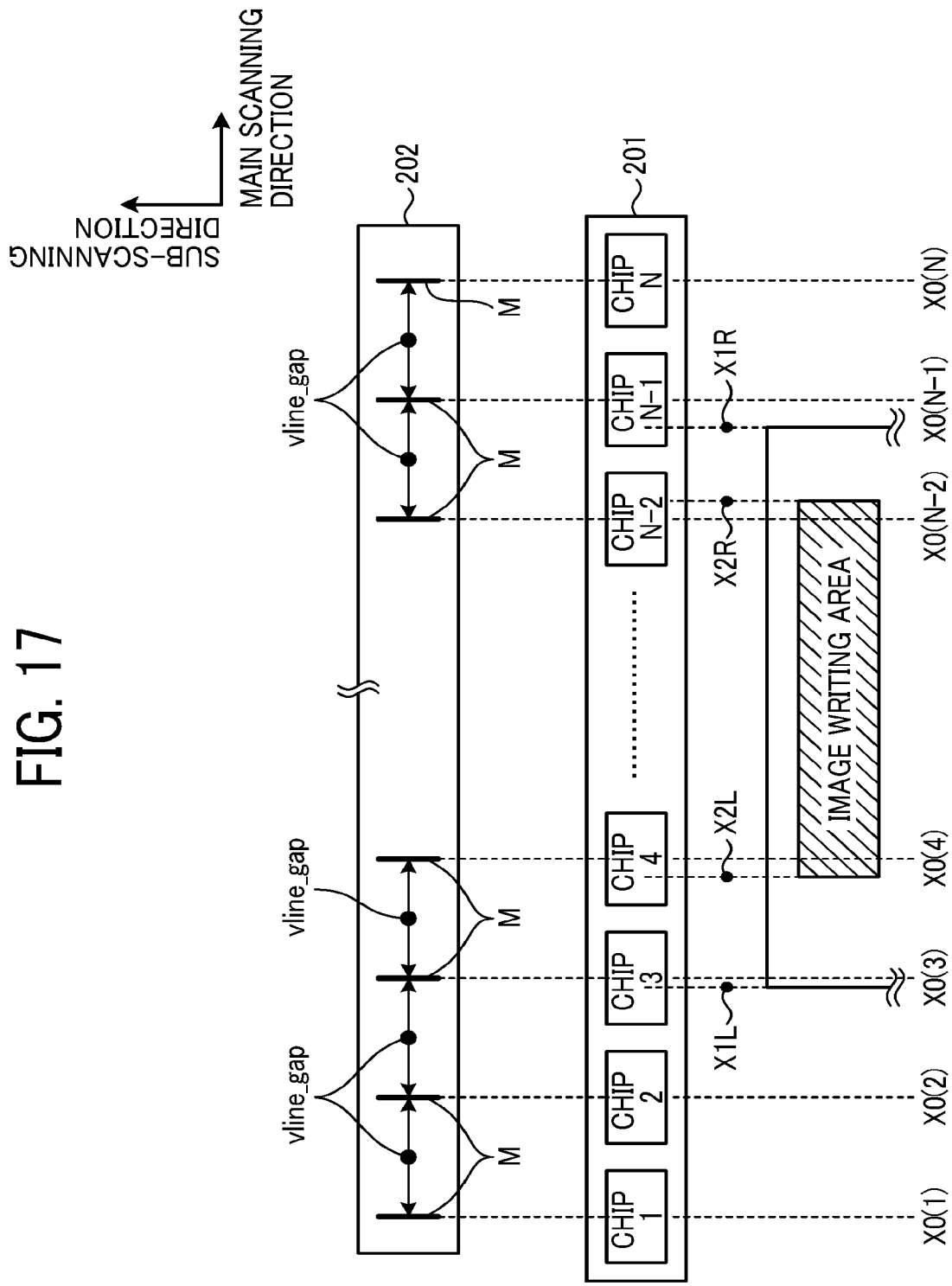
FIG. 17 is a schematic diagram illustrating relative positions of the reading device and the position reference member in the medium position detector.

FIG. 17 is a schematic diagram illustrating relative positions of the reading device 201 and the position reference member 202 in the medium position detector 200. As illustrated in FIG. 17, the position reference member 202 includes a plurality of marks M arranged at regular intervals that is an example of predetermined intervals, and each sensor chip on the board of the reading device 201 reads each mark M, respectively.

Prior to detecting the end position of the recording medium and the end positions of the image pattern, the medium position detector 200 reads the position of the marks M on the position reference member 202 by the reading device 201 and detects the position of each mark M corresponding to each sensor chip. Detected position data becomes a correction parameter.

Figure 18A:
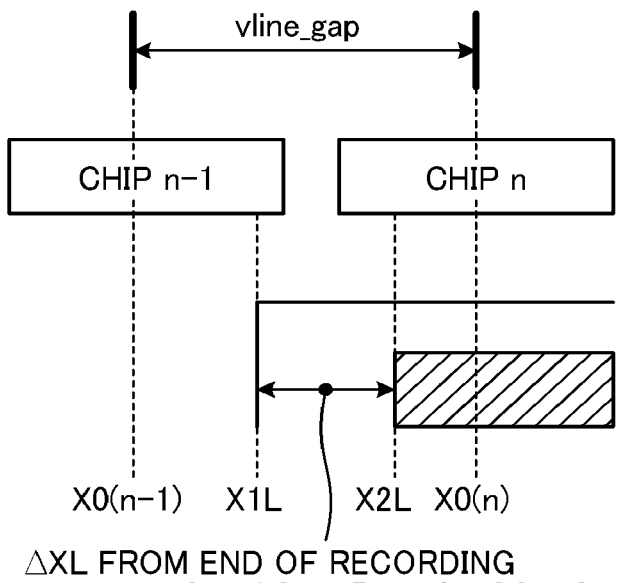
FIGS. 18A and 18B are diagrams illustrating a method of detecting the image writing position using the correction parameter.
Figure 18B:
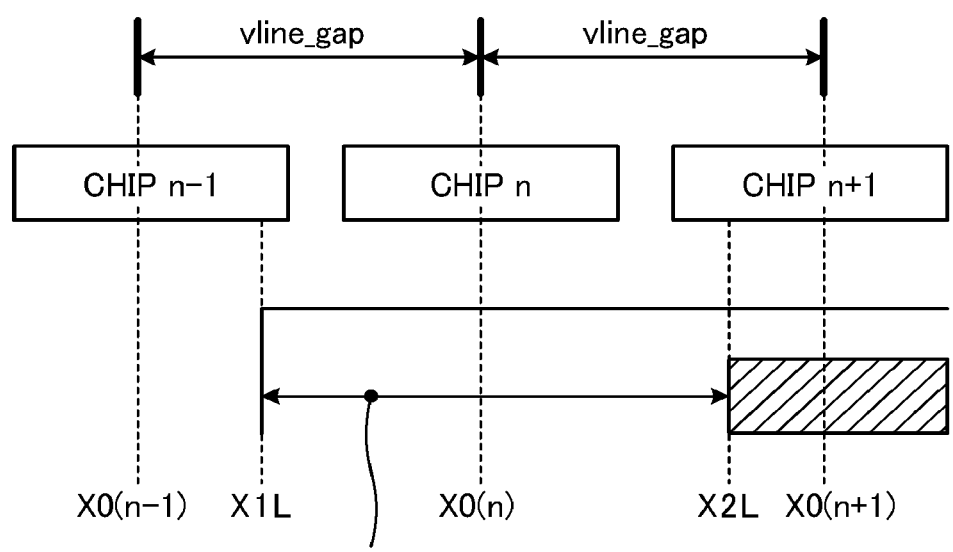

FIGS. 18A and 18B are diagrams illustrating a method of detecting the image writing position using the correction parameter. As illustrated in FIGS. 18A and 18B, the individual length in the main scanning direction of the sensor chips on the reading device 201 is shorter than the length of the board. Therefore, in the present embodiment, the expansion amount of each pixel in the sensor chip of the reading device 201 is smaller than the expansion amount of the board length of the reading device 201 so that it is negligibly small, and the interval between the neighboring sensor chips on the reading device 201 expands by temperature change. The following description is made based on the premise described above.

First, the detection of the image writing position illustrated in FIG. 18A is described.

As illustrated in FIG. 18A, under standard environmental conditions, for example, at low temperature, the second position detection unit 112 detects the positions of the marks M disposed on the position reference member 202 in each of the sensor chips in the reading device 201 from the image read by the reading device 201 and detects the pixel numbers X0 (n) (unit: dot) that correspond to the positions of the marks M as correction parameters, which are the second detection results. In the above, n represents sensor chip numbers 1 to N.

The first position detection unit 111 detects the contour of the recording medium and the position of the image pattern on the recording medium at the leading end side in the main scanning direction from the image read by the reading device 201 as a first detection result. The first detection result is expressed as follows.

The leading end position of the recording medium: X1L (unit: dot)

The leading end position of image pattern: X2L (unit: dot)

The control unit 113 calculates the interval $\Delta$XL between the leading end position X2L of the image pattern with the leading end position X1L of the recording medium as a reference to obtain the writing position on the recording medium. As known data, when the interval between the marks M on the position reference member 202 is vline_gap (unit: mm), and the pixel size of the sensor chip on the reading device 201 is pix_w (unit: mm/dot), $\Delta$XL is calculated as follows.

The position of the image with reference to the leading end in the recording medium in the main scanning direction is given by the following $\Delta$XL.

$$\Delta XL = V\text{line\_gap} - (X1L - X0(n-1)) \times \text{pix\_}w - (X0(n) - X2L) \times \text{pix\_}w \text{(unit:mm)}$$

In the above described equation, X0 (n−1) is a correction parameter of the sensor chip (n−1) on the reading device 201 that detects X1L, and X0 (n) is a correction parameter of the sensor chip (n) on the reading device 201 that detects X2L. Use of the parameters X0 (n) corresponding to X1L and X2L enables a high accurate derivation of the position of the image pattern with respect to the end of the recording medium.

Next, the detection of the image writing position illustrated in FIG. 18B is described.

As illustrated in FIG. 18B, under standard environmental conditions, for example, at low temperature, the second position detection unit 112 detects the positions of the marks M disposed on the position reference member 202 in each of the sensor chips in the reading device 201 from the image read by the reading device 201 and detects the pixel numbers X0 (n) (unit: dot) that correspond to the positions of the marks M as correction parameters, which are the second detection results. In the above, n represents sensor chip numbers 1 to N.

The first position detection unit 111 detects the contour of the recording medium and the position of the image pattern on the recording medium at the leading end side in the main scanning direction from the image read by the reading device 201 as a first detection result. The first detection result is expressed as follows.

The leading end position of the recording medium: X1L (unit: dot)

The leading end position of image pattern: X2L (unit: dot)

The control unit 113 calculates the interval $\Delta$XL between the leading end position X2L of the image pattern with the leading end position X1L of the recording medium as a reference to obtain the writing position on the recording medium. As known data, when the interval between the marks M on the position reference member 202 is vline_gap (unit: mm), and the pixel size of the sensor chip on the reading device 201 is pix_w (unit: mm/dot), $\Delta$XL is calculated as follows.

The position of the image with reference to the leading end in the recording medium in the main scanning direction is given by the following $\Delta$XL.

$$\Delta XL = V\text{line\_gap} \times 2 - (X1L - X0(n-1)) \times \text{pix\_}w - (X0(n+1) - X2L) \times \text{pix\_}w \text{(unit:mm)}$$

The difference between the case illustrated in FIG. 18A and the case illustrated in FIG. 18B is that the vline_gap is doubled. Similarly to the case illustrated in FIG. 18A, use of the correction parameter X0 (n) corresponding to X1L and X2L and multiplication of an appropriate coefficient corresponding to the sensor chip of the reading device 201 that detects X1L and the sensor chip of the reading device 201 that detects X2L on vline_gap enables the high accurate derivation of the position of the image pattern with reference to the end of the recording medium.

The distance $\Delta$XR between the rear end position X2R of the image pattern and the rear end position X1R of the recording medium as a reference may be calculated by the same method as in the above example. For the rear end side in the sub-scanning direction, the leading and rear end position of the recording medium and the leading and rear end position of the image pattern may be detected as in the above example, respectively.

As described above, according to the present embodiment, it is expected that the position detection accuracy can be improved regardless of the mounting tolerance of the sensor chip of the reading device 201 and the expansion amount due to the heat generated in the reading device 201.

Fifth Embodiment

Hereinafter, a description is given of a fifth embodiment of the present disclosure.

The fifth embodiment is different from the first to fourth embodiments in that warp in the height direction (that is the depth direction) as well as expansion in the main scanning direction of the reading device 201 is taken into consideration. In the following description of the fifth embodiment, descriptions of the same parts as in the first to fourth embodiments are omitted, and the description mentioned below is focused on difference between the four embodiments and the fifth embodiment.

Figure 19A:
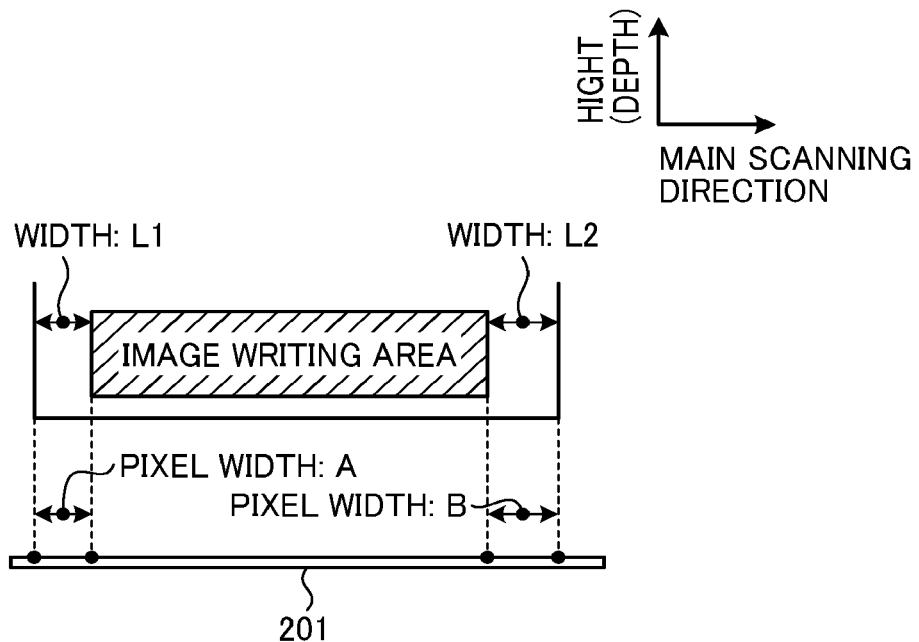
FIGS. 19A and 19B are diagrams illustrating the warp in a height direction (that is, a depth direction) caused by heat in the reading device according to a fifth embodiment.
Figure 19B:
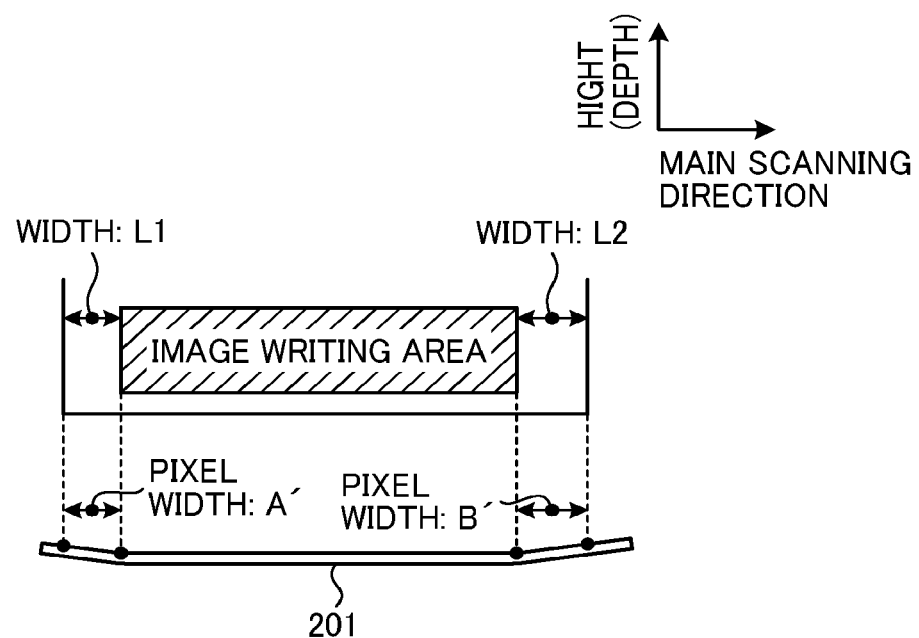

FIGS. 19A and 19B are diagrams illustrating the warp in the height direction caused by heat in the reading device 201 according to the fifth embodiment. As illustrated in FIGS. 19A and 19B, it is generally known that the self-heating and the increase in ambient temperature of the reading device 201 causes the warp in the height direction in addition to the expansion in the main scanning direction to the reading device 201, which results in magnification error in the main scanning direction.

For example, as illustrated in FIG. 19A, when there is no warp in the height direction of the reading device 201, pixel widths become as follows.

Pixel width corresponding to width L1 (unit: mm)=A (unit: dot)

Pixel width corresponding to width L2 (unit: mm)=B (unit: dot).

On the other hand, as illustrated in FIG. 19B, when there is a warp in the height direction of the reading device 201, the pixel widths become as follows.

Pixel width corresponding to width L1 (unit: mm)=A' (unit: dot)

Pixel width corresponding to width L2 (unit: mm)=B' (unit: dot).

In the above, A≠A', B≠B'.

That is, the detected pixel width of the reading device 201 is different for the same physical length.

Figure 20:
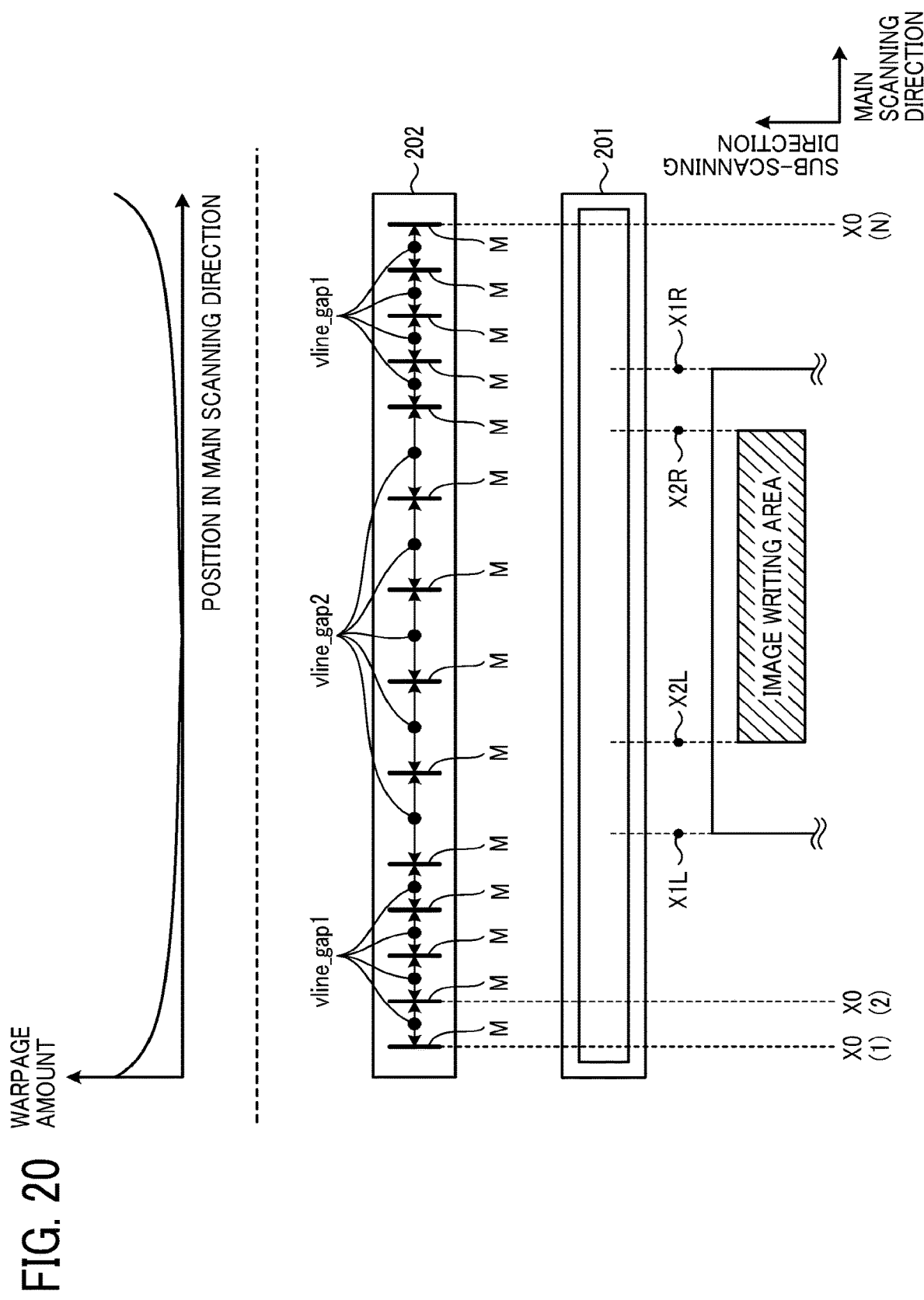
FIG. 20 is a diagram illustrating an arrangement example of marks M on the position reference member corresponding to the warp in the height direction of the reading device.

FIG. 20 is a diagram illustrating an arrangement example of the marks M on the position reference member 202 corresponding to the warp in the height direction of the reading device 201. As illustrated in FIG. 20, the marks M in the medium position detector 200 according to the present embodiment are disposed on the position reference member 202 at predetermined intervals corresponding to the warp amounts of the reading device 201.

Specifically, as illustrated in FIG. 20, the warp amount in the height direction of the reading device 201 abruptly increases from a certain position in the main scanning direction to both end portions. Therefore, in the present embodiment, the interval between the marks M is set to become narrower in areas where the effects on the detection accuracy error due to the warp is larger, as follows.

In both end areas in the main scanning direction in which the warp amount is large, the interval is set a predetermined narrower interval vline_gap1.

In center area in the main scanning direction in which the warp amount is small, the interval is set a predetermined wider interval vline_gap2.

Thus, the same method as in the above-described fourth embodiment can be applied to the detection of the image writing position using the position detection result of the mark M on the position reference member 202 as the correction parameter.

The arrangement pattern of the marks M on the position reference member 202 is not limited to the content described in this embodiment. The intervals between the marks M on the position reference member 202 in FIG. 20 are two values. However, the intervals between the marks M on the position reference member 202 may be set to be gradually broader from both ends to the center in the main scanning direction.

As described above, since the medium position detector 200 according to the present embodiment takes measures against not only expansion of the reading device 201 in the main scanning direction but also warp in the height direction of the reading device 201, the medium position detector 200 can detect the ends of the recording medium and the image position with high accuracy.

Sixth Embodiment

Hereinafter, a description is given of a sixth embodiment of the present disclosure.

The sixth embodiment is different from the first to fifth embodiments in that the position of the mark M arranged on the position reference member 202 is detected for each job start command. In the following description of the sixth embodiment, descriptions of the same parts as in the first to fifth embodiments are omitted, and the description mentioned below is focused on difference between the five embodiments and the sixth embodiment.

Figure 21:
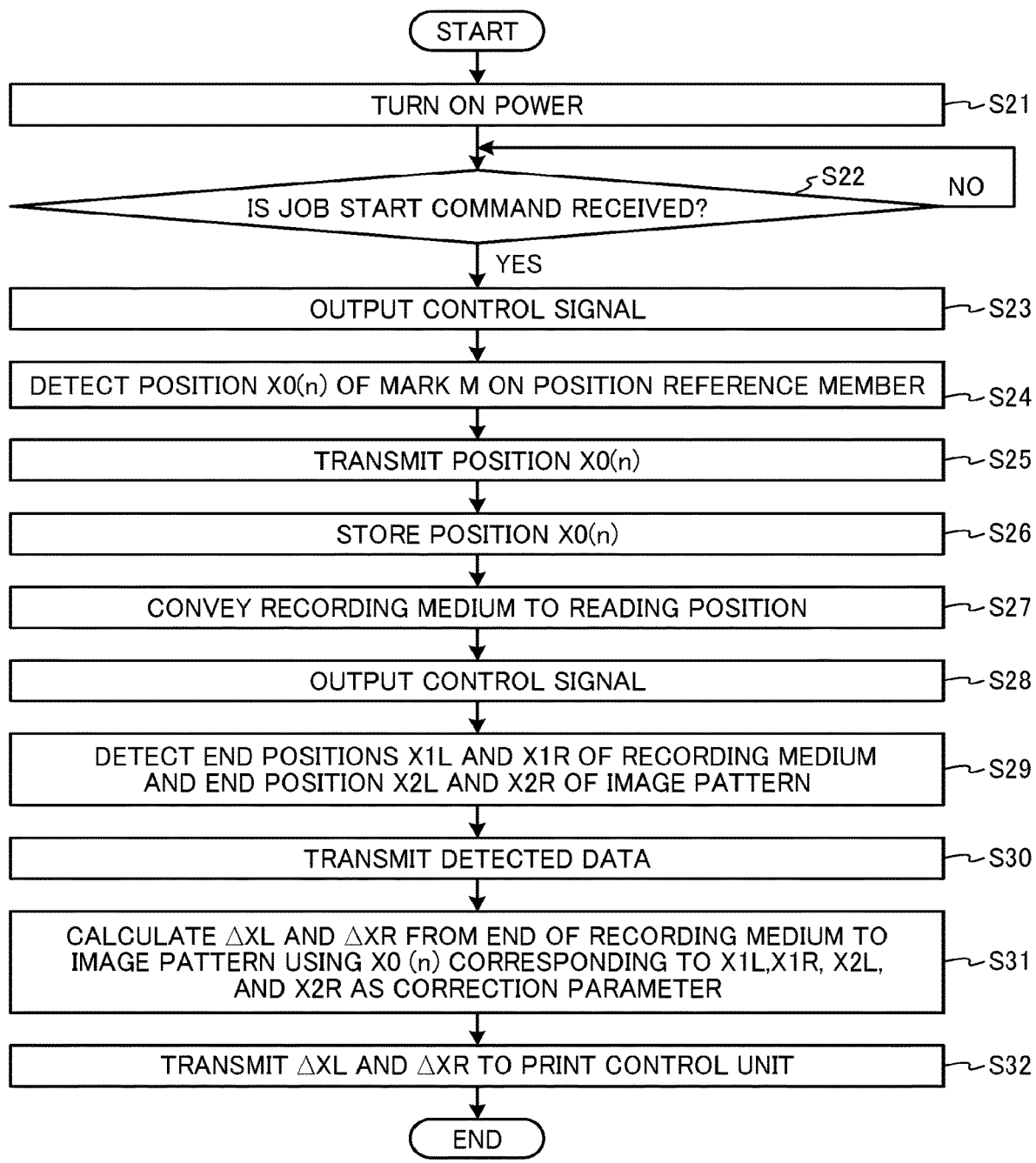
FIG. 21 is a flowchart illustrating the transmission processing of the image writing position according to a sixth embodiment.

FIG. 21 is a flowchart illustrating the transmission processing of the image writing position according to the sixth embodiment. As illustrated in FIG. 21, in step S21, turning on the power starts power supply to the printing system 1, and, thereafter, the control unit 113 waits until receiving a job start command of the print job from the user (No in step S22).

Upon receiving the print job start command (Yes in step S22), the control unit 113 outputs the control signal to detect the position X0(n) of the mark M disposed on the position reference member 202 to the second position detection unit 112 in step S23.

In step S24, the second position detection unit 112 receives the control signal, controls the reading device 201 to read the mark M disposed on the position reference member 202, and detects the position X0(n) of the mark M.

The second position detection unit 112 transmits the position X0(n) of the mark M to the control unit 113 as the detection result in step S25.

The control unit 113 stores the transmitted position X0(n) of the mark M in the RAM 12b or the like as a memory in step S26.

Next, the control unit 113 conveys the recording medium on which the image pattern is printed to the reading position of the reading device 201 in step S27.

In step S28, the control unit 113 outputs to the first position detection unit 111 a control signal to detect the contour of the conveyed recording medium and the position of the image pattern on the recording medium.

In step S29, the first position detection unit 111 receives the control signal, controls the reading device 201 to read the contour of the conveyed recording medium and the position of the image pattern on the recording medium, and detects the contour of the recording medium and the position of the image pattern on the recording medium. Specifically, various positions written below are detected.

The leading end position of the recording medium: X1L (unit: dot)

The rear end position of the recording medium: X1R (unit: dot)

The leading end position of image pattern: X2L (unit: dot)

The rear end position of the image pattern: X2R (unit: dot)

In step S30, the first position detection unit 111 transmits the contour of the recording medium and the position of the image pattern on the recording medium to the control unit 113 as the detection result.

In step S31, using the X0(n) corresponding to each of X1L, X1R, X2L, and X2R as the correction parameter, the control unit 113 calculates ΔXL, ΔXR, which are lengths from the end position of the recording medium to the end position of the image pattern.

In step S32, the control unit 113 converts ΔXL and ΔXR, which give image writing positions on the recording medium, into image writing position data and transmits the image writing position data to the print control unit 114.

As described above, the present embodiment becomes a countermeasure against a change in the expansion of the reading device 201 during the time from turning on the power to the start of the print job. Upon receiving the print job start command, the detection of the position of the mark M on the position reference member 202 before the start of the reading operation of the recording medium leads to the update of the correction parameter based on the expansion of the reading device 201, resulting in stabilization of accuracy.

Seventh Embodiment

Hereinafter, a description is given of a seventh embodiment of the present disclosure.

The seventh embodiment is different from the first to sixth embodiments in that the position of the mark M arranged on the position reference member 202 is detected at predetermined intervals after the job start command. In the following description of the seventh embodiment, descriptions of the same parts as in the first to sixth embodiments are omitted, and the description mentioned below is focused on difference between the six embodiments and the seventh embodiment.

Figure 22:
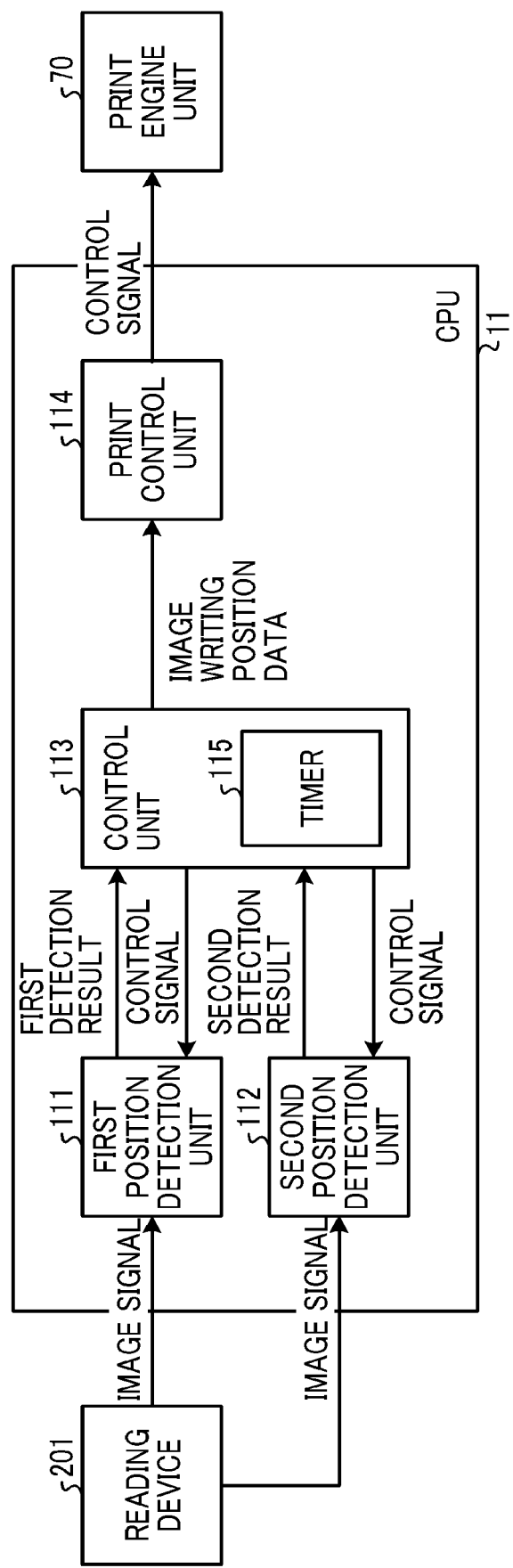
FIG. 22 is a functional block diagram illustrating functional components of the printing system according to a seventh embodiment.

FIG. 22 is a functional block diagram illustrating functional components of the printing system 1 according to the seventh embodiment.

As illustrated in FIG. 22, the CPU 11 of the printing system 1 functions as a timer 115 in addition to the first position detection unit 111, the second position detection unit 112, the control unit 113, the print control unit 114.

The timer 115 measures time from an arbitrary point in time. When the measured time exceeds the predetermined time, the control unit 113 outputs the control signal to the second position detection unit 112 to detect the position of the mark M on the position reference member 202 based on the image signal from the reading device 201.

Figure 23:
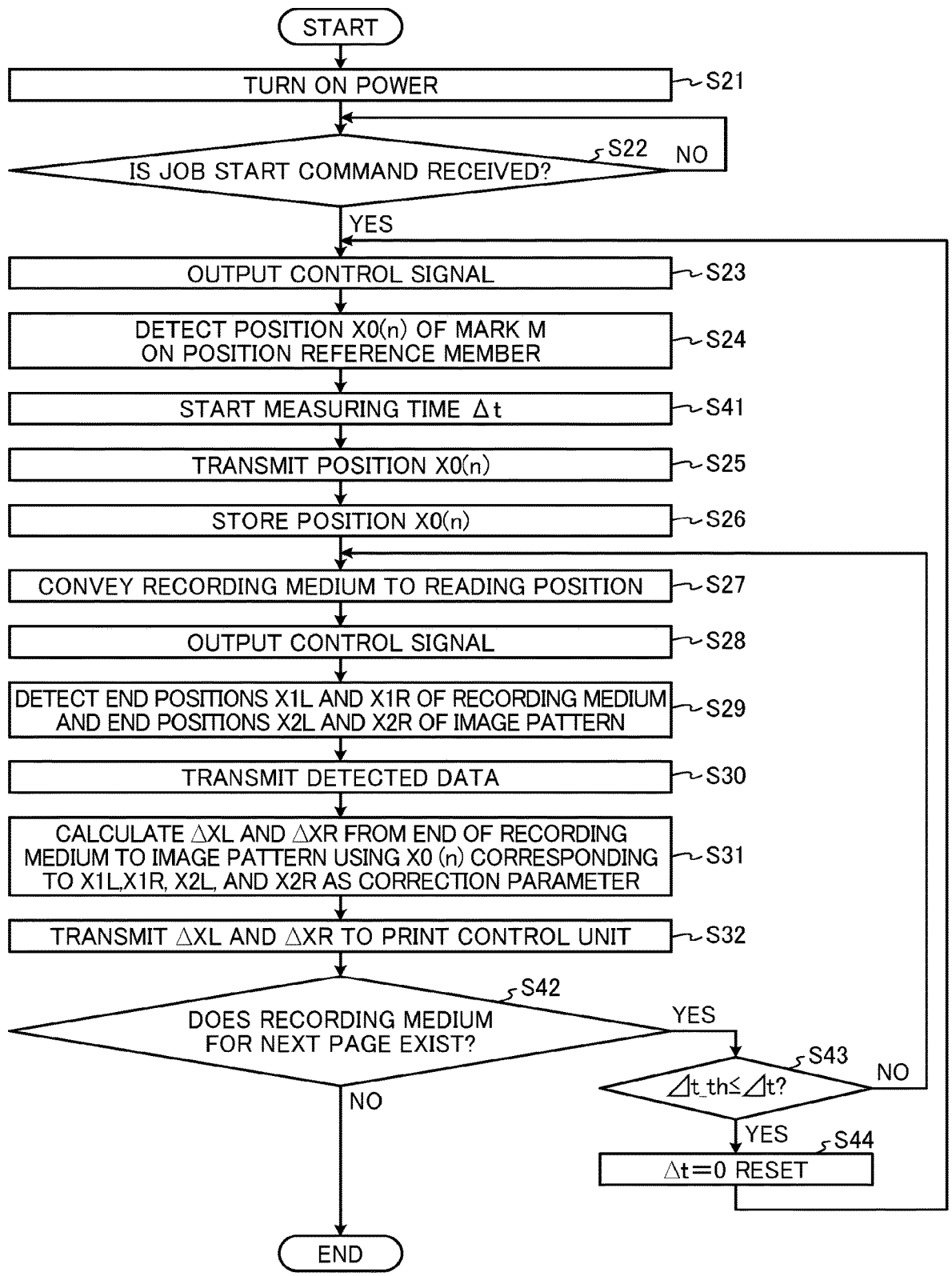
FIG. 23 is a flowchart illustrating the transmission processing of an image writing position.

FIG. 23 is a flowchart illustrating the transmission processing of the image writing position. Steps S21 to S24 illustrated in FIG. 23 are performed in a substantially similar manner as described above referring to steps S21 to S24 in FIG. 21 according to the sixth embodiment, and description thereof is omitted.

In the following step S41, the timer 115 starts measuring a time Δt at the timing when the second position detection unit 112 completes the reading operation of the mark M disposed on the position reference member 202.

Subsequent Steps S25 to S32 illustrated in FIG. 23 are performed in a substantially similar manner as described above referring to steps S25 to S32 in FIG. 21 according to the sixth embodiment, and description thereof is omitted.

After notifying the print control unit 114 of the image writing position information in step S32, the control unit 113 determines whether the recording medium of the next page exists in step S42.

When determining that there is no recording medium of the next page (No in step S42), the control unit 113 completes the flow.

On the other hand, when determining that the recording medium of the next page exists (Yes in step S42), the control unit 113 determines whether the time Δt is equal to or greater than a predetermined threshold Δt_th in step S43.

In the case of Δt_th>Δt (No in step S43), the control unit 113 determines that it is not the reading timing of the position reference member 202 and returns to step S27 to perform the reading operation of the recording medium of the next page.

On the other hand, in the case of Δt_th≤Δt (Yes in step S43), the measured time is initialized, that is, reset Δt to 0 in step S44, and the control unit 113 returns the process to step S23 to execute reading operation of the position reference member 202 again, update of X0 (n), and start of measuring the time Δt.

As described above, the present embodiment becomes a countermeasure against a change in the expansion of the reading device 201 during the print job, that is, for the time from start to end of reading a plurality of recording media continuously. The detection of the position of the mark M on the position reference member 202 at the predetermined intervals leads to the update of the correction parameter based on the expansion of the reading device 201, resulting in stabilization of accuracy.

Eighth Embodiment

Hereinafter, a description is given of an eighth embodiment of the present disclosure.

The eighth embodiment is different from the first to seventh embodiments in that the position of the mark M arranged on the position reference member 202 is detected for each predetermined temperature change amount after the job start command. In the following description of the eighth embodiment, descriptions of the same parts as in the first to seventh embodiments are omitted, and the description mentioned below is focused on difference between the seven embodiments and the eighth embodiment.

Figure 24A:
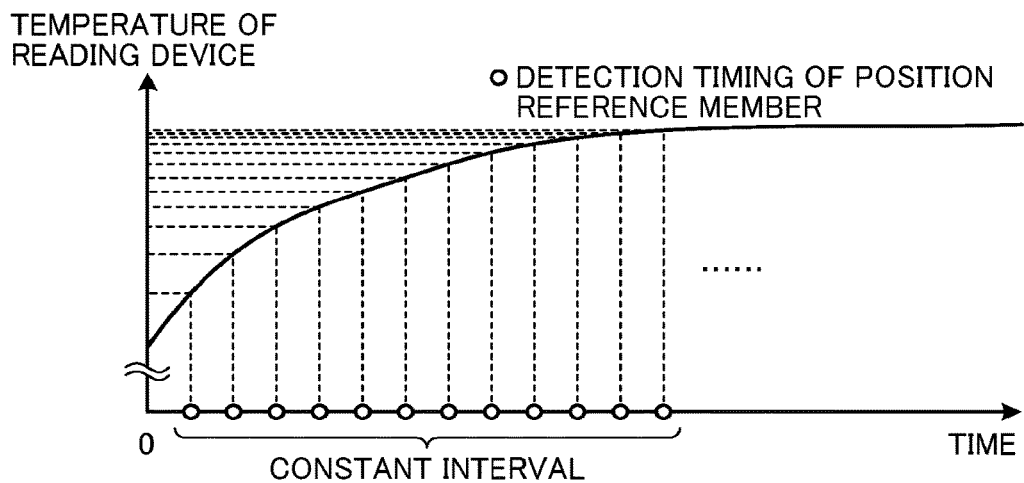
FIG. 24A is a diagram illustrating temperature change in the reading device according to a seventh embodiment.
Figure 24B:
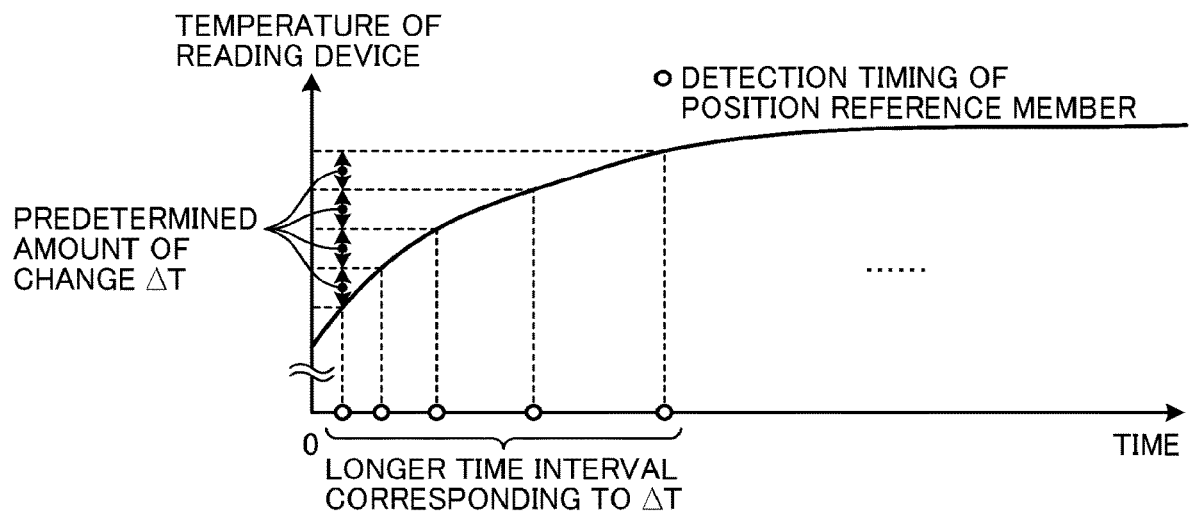
FIG. 24B is a diagram illustrating temperature change in the reading device according to an eighth embodiment.

FIGS. 24A and 24B are diagrams illustrating temperature change in the reading device 201 according to the eighth embodiment. As illustrated in FIGS. 24A and 24B, the temperature change in the reading device 201 is not necessarily proportional to the elapsed time. Generally, when the timing of turning on the power or start of a predetermined operation after turning on the power is designated as a starting point of time measurement, the temperature change amount per unit time is large at the initial stage, and as the temperature rises, the amount of temperature change per unit time gently decreases. Finally, the temperature of the reading device 201 generally converges to a certain temperature.

Therefore, as the elapsed time from job start becomes longer, effect of detection of the position of mark M on the position reference member 202 at the predetermined interval, that is, a predetermined frequency, as described in the seventh embodiment becomes smaller. Although this may not cause a disadvantage for the detection accuracy, this may cause a disadvantage that time required for the job becomes longer than necessary (See FIG. 24A).

The expansion of the reading device 201 is proportional to the temperature change amount of the reading device 201 itself. Therefore, in the present embodiment, reading the mark M on the position reference member 202 each time the temperature change amount of the reading device 201 reaches the predetermined amount leads to a minimum time from the job start to the end.

Specifically, when the temperature rise curve is illustrated in FIG. 24B, the time interval in which the reading device 201 reads the mark M is set at high frequency immediately after the start of time measurement and at low frequency with the lapse of time.

The detailed time interval may be set to a time at which a predetermined temperature change amount is generated based on a result such as a temperature rise test of the reading device 201 at the development stage.

Figure 25:
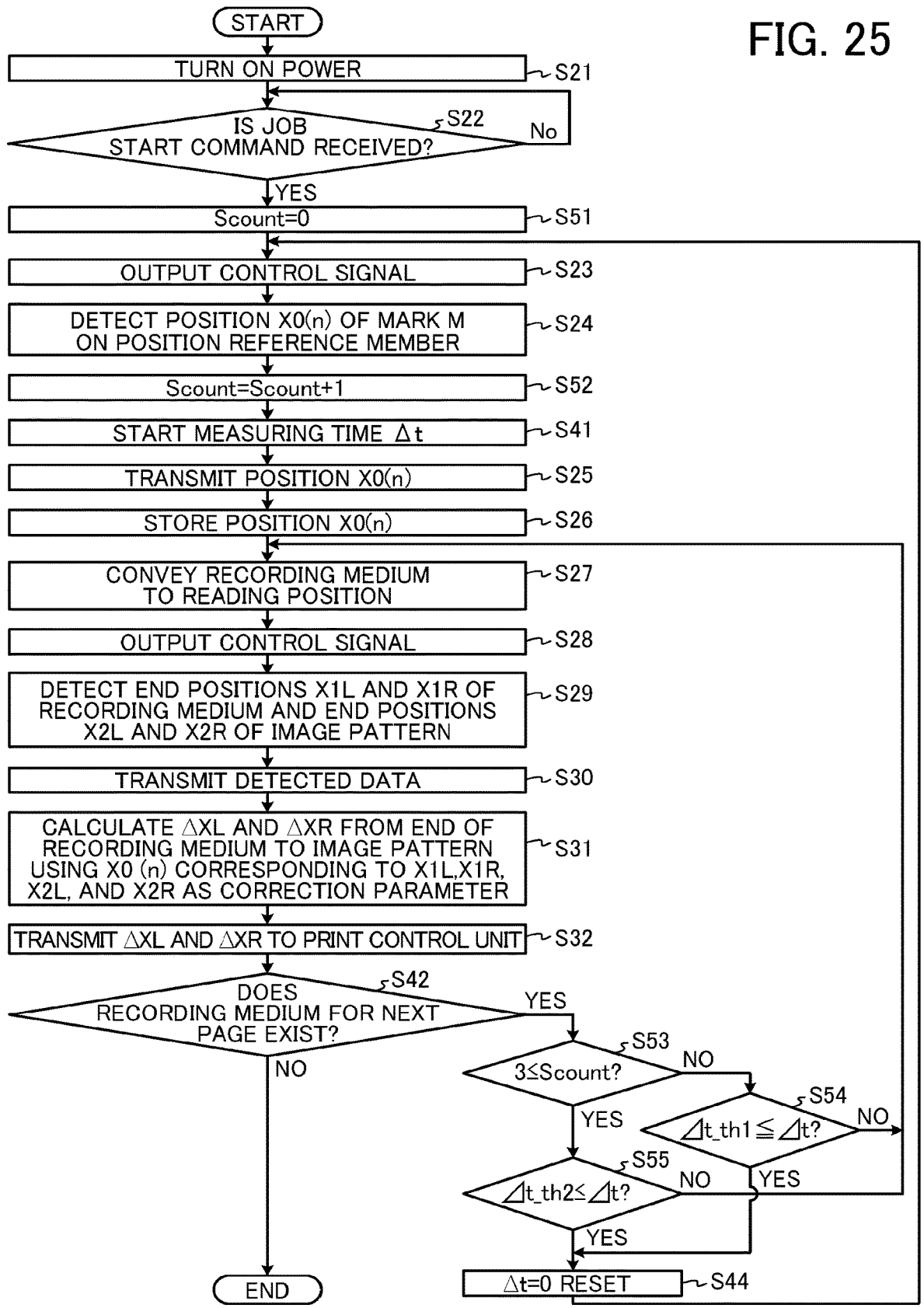
FIG. 25 is a flowchart illustrating the transmission processing of an image writing position.

FIG. 25 is a flowchart illustrating the transmission processing of the image writing position. Steps S21 to S22 illustrated in FIG. 25 are performed in a substantially similar manner as described above referring to steps S21 to S22 in FIG. 21 according to the sixth embodiment, and description thereof is omitted.

In the following step S51, the control unit 113 initializes the variable Scount for counting the number of reading operations of the position reference member 202 to 0 at the timing of receiving the print job start command.

Steps S23 to S24 illustrated in FIG. 25 are performed in a substantially similar manner as described above referring to steps S23 to S24 in FIG. 21 according to the sixth embodiment, and description thereof is omitted.

In the following step S52, the control unit 113 counts the completion of the reading operation of the position reference member 202 at the timing when the second position detection unit 112 completes the reading operation of the mark M disposed on the position reference member 202 and increments Scount by +1.

In step S41, the timer 115 starts measuring the time Δt at the timing when the second position detection unit 112 completes the reading operation of the mark M disposed on the position reference member 202.

Subsequent Steps S25 to S32 illustrated in FIG. 25 are performed in a substantially similar manner as described above referring to steps S25 to S32 in FIG. 21 according to the sixth embodiment, and description thereof is omitted.

After notifying the print control unit 114 of the image writing position information in step S32, the control unit 113 determines whether the recording medium of the next page exists in step S42.

When determining that there is no recording medium of the next page (No in step S42), the control unit 113 completes the flow.

On the other hand, when the control unit 113 determines that there is a recording medium of the next page (Yes in step S42), the control unit 113 determines from the value of Scount whether the reading operation of the position reference member 202 is performed three or more times in the job in step S53.

In the case of 3>Scount (No in step S53) and Δt_th>Δt (No in step S54), the control unit 113 determines that it is not the reading timing of the position reference member 202 and returns to step S27 to perform the reading operation of the recording medium of the next page.

On the other hand, in the case of 3>Scount (No in step S53) and Δt_th≤Δt (Yes in step S53), the measured time is initialized, that is, reset Δt=0 in step S44, and the control unit 113 returns the process to step S23 to execute reading operation of the position reference member 202 again, update of X0 (n), and start of measuring the time Δt.

In the case of 3≤Scount (Yes in step S53) and Δt_th2>Δt (No in step S55), the control unit 113 determines that it is not the reading timing of the position reference member 202 and returns to step S27 to perform the reading operation of the recording medium of the next page.

On the other hand, in the case of 3≤Scount (Yes in step S53) and Δt_th2≤Δt (Yes in step S55), the measured time is initialized, that is, reset Δt=0 in step S44, and the control unit 113 returns the process to step S23 to execute reading operation of the position reference member 202 again, update of X0 (n), and start of measuring the time Δt.

It should be noted that Δt_th1 and Δt_th2 are set so that Δt_th1<Δt_th2. This setting leads to the threshold to be Δt_th1 when Scount=1 or 2, which leads to higher frequent reading operation of the position reference member 202, and, when Scount=3 or more, leads to the threshold Δt_th2, which leads to lower frequent reading operation of the position reference member 202 than that when Scount=1 or 2 that means a predetermined elapsed time from job start.

In the present embodiment, the frequency of reading the position reference member 202 is changed with Scount=3 as the boundary but may be appropriately set based on application because an actual temperature gradient of the reading device 201 changes depending on the application or environment in which the reading device 201 is used.

In the present embodiment, only two kinds of time intervals Δt_th1 and Δt_th2 are provided, but subdividing time into three types or four types can further reduce the number of reading operations of the position reference member 202.

As described above, in the present embodiment, the timer 115 measures the elapsed time from the job start, and the second position detection unit 112 detects the position of the mark M arranged on the position reference member 202 at the predetermined timing which is set to be relatively frequent, that is, the short update interval immediately after job start and to be relatively low frequent, that is, the longer update interval with the lapse of time. This enables detection of expansion of the reading device 201 and update of the correction parameter during the job. This minimizes the correction parameter update frequency in the job, shortens the time required for the job as much as possible, which improves productivity, and makes it possible to maintain high detection accuracy.

Ninth Embodiment

Hereinafter, a description is given of a ninth embodiment of the present disclosure.

The ninth embodiment is different from the first to eighth embodiments in that the temperature of the reading device 201 is directly measured. In the following description of the ninth embodiment, descriptions of the same parts as in the first to eighth embodiments are omitted, and the description mentioned below is focused on difference between the eight embodiments and the ninth embodiment.

In the eighth embodiment, the timing of reading the position reference member 202 is managed with time, but in the present embodiment, the temperature of the reading device 201 is directly measured.

Figure 26:
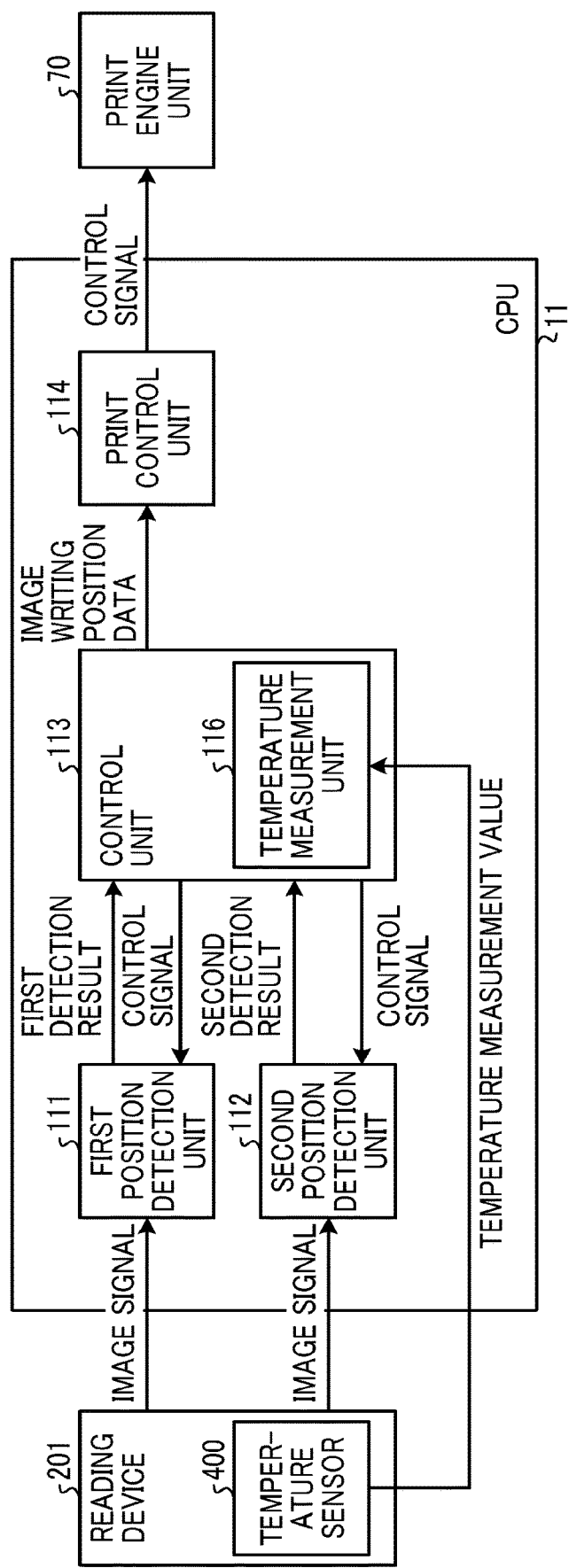
FIG. 26 is a functional block diagram illustrating functional components of the printing system according to a ninth embodiment.

FIG. 26 is a functional block diagram illustrating functional components of the printing system 1 according to the ninth embodiment.

As illustrated in FIG. 26, the CPU 11 of the printing system 1 functions as a temperature measurement unit 116 in addition to the first position detection unit 111, the second position detection unit 112, the control unit 113, the print control unit 114.

The temperature measurement unit 116 acquires a temperature value from a temperature sensor 400 provided in the reading device 201 at an arbitrary point in time. When the measured temperature value exceeds a predetermined value, the control unit 113 outputs the control signal to the second position detection unit 112 to detect the position of the mark M on the position reference member 202 based on the image signal from the reading device 201.

Figure 27:
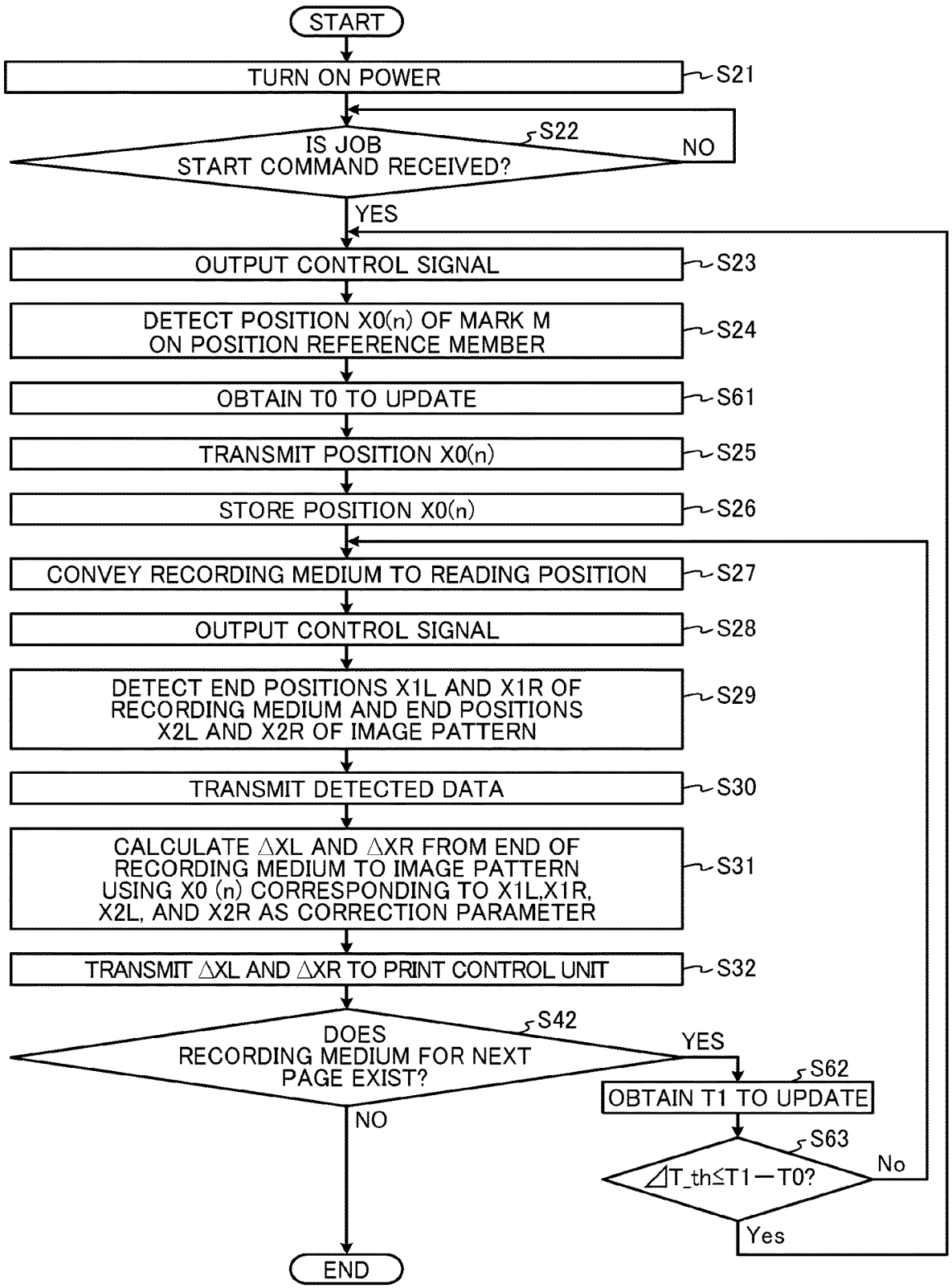
FIG. 27 is a flowchart illustrating the transmission processing of an image writing position.

FIG. 27 is a flowchart illustrating the transmission processing of the image writing position. Steps S21 to S24 illustrated in FIG. 27 are performed in a substantially similar manner as described above referring to steps S21 to S24 in FIG. 21 according to the sixth embodiment, and description thereof is omitted.

In the following step S61, the temperature measurement unit 116 acquires the measured temperature value T0 as the temperature value at the start of temperature measurement at the timing when the second position detection unit 112 completes the reading operation of the mark M disposed on the position reference member 202 and stores the measured temperature value T0 in the memory.

Subsequent Steps S25 to S32 illustrated in FIG. 27 are performed in a substantially similar manner as described above referring to steps S25 to S32 in FIG. 21 according to the sixth embodiment, and description thereof is omitted.

After notifying the print control unit 114 of the image writing position information in step S32, the control unit 113 determines whether the recording medium of the next page exists in step S42.

When determining that there is no recording medium of the next page (No in step S42), the control unit 113 completes the job.

On the other hand, when determining that the recording medium of the next page exists (Yes in step S42), the control unit 113 acquires the present temperature measurement value T1 in step S62 and determines whether the temperature change T1−T0 is equal to or greater than a predetermined temperature change threshold $\Delta T\_th$ in step S63.

In the case of $\Delta T\_th > T1-T0$ (No in step S63), the control unit 113 determines that it is not the reading timing of the position reference member 202 and returns to step S27 to perform the reading operation of the recording medium of the next page.

On the other hand, when $\Delta T\_th \leq T1-T0$ (Yes in step S63), the control unit 113 returns to step S23 again, executes reading operation of the position reference member 202 to update X0 (n), and acquires the measured temperature value T0 to update T0 held in the memory.

The temperature change threshold $\Delta T\_th$ may be set to a value within an allowable range to ensure the position detection accuracy required for the application to be applied and may be determined from the result of the temperature rise test etc. of the reading device 201 at the development stage.

As described above, in the present embodiment, the temperature measurement unit 116 and the temperature sensor 400 measure the temperature change, and the second position detection unit 112 detects the position of the mark M arranged on the position reference member 202 at the predetermined timing in which the predetermined temperature change occurs. This enables detection of expansion of the reading device 201 and update of the correction parameter during the job. This minimizes the correction parameter update frequency in the job, shortens the time required for the job as much as possible, which improves productivity, and makes it possible to maintain high detection accuracy.

The above embodiments describe examples in which the position detector, the image reading device, and the image forming apparatus of the present disclosure are applied to the printing system including an electrophotographic printing device, but the present disclosure is not limited to them. The present disclosure may be applied to a printing system including an ink jet type printing apparatus.

The above embodiments describe examples in which the position detector, the image reading device, and the image forming apparatus of the present disclosure are applied to the printing system including the printer such as the commercial printing apparatus called the production printing machine, but the present disclosure is not limited to them. The present disclosure may be applied to any image forming apparatus such as copiers, printers, scanners, fax machines, and multifunction peripherals (MFPs) having at least two of copying, printing, scanning, and facsimile transmission capabilities.

The above embodiments describe examples in which the position detector of the present disclosure is applied to the position detection in the image forming apparatus, but the present disclosure is not limited to this. The present disclosure may be applied to, for example, position detection applications in various kinds of areas such as an inspection in a factory automation (FA) area.

It is to be noted that the above embodiment is presented as examples to realize the present disclosure, and it is not intended to limit the scope of the disclosure. These novel embodiments can be implemented in various other forms, and various omissions, substitutions, and changes can be made without departing from the gist of the disclosure. These embodiments and variations are included in the scope and gist of the disclosure and are included in the disclosure described in the claims and the equivalent scope thereof.

The embodiment and variations described above are preferred example embodiments of the present disclosure, and various applications and variations may be made without departing from the scope of the present disclosure. For example, elements and/or features of different illustrative embodiments may be combined with each other and/or substituted for each other within the scope of the present disclosure.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

Each of the functions of the described embodiments may be implemented by one or more processing circuits. A processing circuit includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

What is claimed is:

1. A position detector, comprising:
 a reading device;
 a position reference member having a plurality of marks disposed opposite the reading device and along a main scanning direction of the reading device; and
 circuitry configured to control the reading device to detect a first detection result indicating a contour of a processing target and a position of an image pattern on the processing target;

control the reading device to detect a second detection result indicating a plurality of positions of the plurality of marks, the plurality of marks having been arranged on the position reference member based on a variation of positions of the reading device in the main scanning direction, the variation of positions of the reading device being expansion and contraction of the reading device due to temperature distortion of the reading device; and correct a processing position for the processing target to offset the temperature distortion of the reading device based on the first detection result and the second detection result.

2. The position detector according to claim 1, wherein the position reference member is made of glass.

3. An image forming apparatus, comprising:
the position detector according to claim 1; and
a print engine, wherein
the circuitry is further configured to control the print engine based on image writing position data transmitted from the position detector to write an image on a recording medium.

4. The position detector according to claim 1, wherein the plurality of marks are arranged at predetermined intervals on the position reference member.

5. The position detector according to claim 1, wherein the circuitry is further configured to control the reading device to detect the plurality of positions of the plurality of marks on the position reference member in a case that the reading device is activated.

6. The position detector according to claim 1, wherein the circuitry is further configured to control the reading device to detect a mark on the position reference member upon receiving a job start command.

7. The position detector according to claim 1, further comprising:
a timer that measures an elapsed time from completion of detection of a position of a mark, wherein
the circuitry is further configured to control the reading device to detect the position of the mark on the position reference member after the elapsed time reaches a predetermined time.

8. The position detector according to claim 7, wherein the circuitry is further configured to lengthen the predetermined time as the elapsed time becomes longer.

9. The position detector according to claim 1, further comprising:
a temperature sensor to measure a temperature of the reading device, wherein
the circuitry is further configured to control the reading device to detect a position of a mark on the position reference member in a case that a temperature change amount measured by the temperature sensor reaches a predetermined amount.

10. The position detector according to claim 1, wherein a position in a depth direction at which the reading device reads the processing target coincides with a position in the depth direction at which the reading device reads the mark of the position reference member.

11. A non-transitory computer-readable recording medium storing computer executable instructions which, when executed by an apparatus, instructs the apparatus to execute a position detecting method comprising:
detecting, by a reading device, a first result indicating a contour of a processing target and a position of a pattern on the processing target;
detecting, by the reading device, a second detection result indicating a plurality of positions of a plurality of marks disposed on a position reference member opposite the reading device and along a main scanning direction of the reading device, wherein the plurality of marks having been arranged on the position reference member based on a variation of positions of the reading device in the main scanning direction, and the variation of positions of the reading device being expansion and contraction of the reading device due to temperature change of the reading device; and
correcting a processing position for the processing target to offset distortion of the reading device based on the first detection result and the second detection result.

12. The non-transitory computer-readable recording medium according to claim 11, wherein the position detecting method further comprises detecting the plurality of positions of the plurality of marks on the position reference member in a case that the reading device is activated.

13. The non-transitory computer-readable recording medium according to claim 11, wherein the position detecting method further comprises detecting a mark on the position reference member upon receiving a job start command.

14. The non-transitory computer-readable recording medium according to claim 11, wherein the position detecting method further comprises;
measuring an elapsed time from completion of detection of the position of the mark; and
detecting the position of the mark on the position reference member after the elapsed time reaches a predetermined time.

15. The non-transitory computer-readable recording medium according to claim 11, wherein the marks are arranged at predetermined intervals on the position reference member.

16. A position detecting method, comprising:
detecting, by a reading device, a first result indicating a contour of a processing target and a position of a pattern on the processing target;
detecting, by the reading device, a second detection result indicating a plurality of positions of a plurality of marks disposed on a position reference member opposite the reading device and along a main scanning direction of the reading device, wherein the plurality of marks having been arranged on the position reference member based on a variation of positions of the reading device in the main scanning direction, and the variation of positions of the reading device being expansion and contraction of the reading device due to temperature change of the reading device; and
correcting a processing position for the processing target to offset distortion of the reading device based on the first detection result and the second detection result.

* * * * *